United States Patent
Nakatani et al.

(10) Patent No.: US 9,262,705 B2
(45) Date of Patent: Feb. 16, 2016

(54) PROCESSING AND PRINTING APPARATUS, AND PROCESSING METHOD FOR SUPPRESSING BRONZING IN A PRINTED IMAGE

(71) Applicant: CANON KABUSHIKI KAISHA, Tokyo (JP)

(72) Inventors: Akihiko Nakatani, Kawasaki (JP); Okinori Tsuchiya, Kawasaki (JP); Tohru Ikeda, Yokohama (JP); Yugo Mochizuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/872,538

(22) Filed: Apr. 29, 2013

(65) Prior Publication Data

US 2013/0301065 A1 Nov. 14, 2013

(30) Foreign Application Priority Data

May 8, 2012 (JP) .................. 2012-107039
Apr. 15, 2013 (JP) .................. 2013-084980

(51) Int. Cl.
| | |
|---|---|
| *H04N 1/60* | (2006.01) |
| *G06K 15/02* | (2006.01) |
| *G06K 15/10* | (2006.01) |
| *H04N 1/54* | (2006.01) |
| *B41J 2/21* | (2006.01) |

(52) U.S. Cl.
CPC ........... *G06K 15/1878* (2013.01); *B41J 2/2114* (2013.01); *G06K 15/105* (2013.01); *H04N 1/54* (2013.01); *H04N 1/6075* (2013.01); *G06K 2215/0082* (2013.01)

(58) Field of Classification Search
None
See application file for complete search history.

(56) References Cited

U.S. PATENT DOCUMENTS

| | | | |
|---|---|---|---|
| 6,341,833 B1 | 1/2002 | Liu et al. | |
| 7,355,636 B2 | 4/2008 | Takeuchi | |
| 8,027,058 B2* | 9/2011 | Jinno | 358/1.9 |
| 8,485,629 B2 | 7/2013 | Iritani et al. | |
| 8,888,204 B2 | 11/2014 | Iritani et al. | |
| 2012/0050762 A1* | 3/2012 | Konno et al. | 358/1.9 |
| 2013/0120801 A1* | 5/2013 | Shibasaki et al. | 358/3.24 |

FOREIGN PATENT DOCUMENTS

| | | |
|---|---|---|
| JP | 2001-138555 A | 5/2001 |
| JP | 2003-134350 | 5/2003 |
| JP | 2004-153337 | 5/2004 |
| JP | 2007-026290 | 2/2007 |
| JP | 2011-218564 | 11/2011 |
| JP | 2012-051187 | 3/2012 |

OTHER PUBLICATIONS

WO2012/014413, Shibasaki et al., Feb. 2012.*

* cited by examiner

*Primary Examiner* — Paul F Payer
(74) *Attorney, Agent, or Firm* — Fitzpatrick, Cella, Harper & Scinto

(57) ABSTRACT

Differences in color change due to bronze colors and the optical interference state related to bronzing are suppressed among multiple print modes. The blue primary color "Blue" in the standard RGB gamut is mapped to a point (color) that has moved in the clockwise direction, and that color is taken to be the primary color "Blue-s" in the Standard mode gamut. As a result, when an observer observes this color, the color shifted in the counter-clockwise direction is perceived as a color of the same hue as the primary color "Blue-f" in the Fine mode gamut, suppressing the difference in perceived color between the Fine mode and the Standard mode.

14 Claims, 18 Drawing Sheets

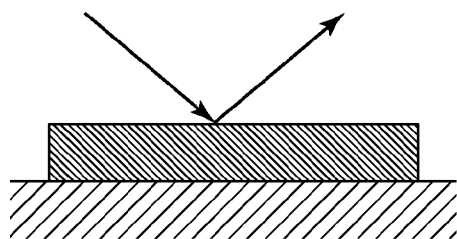
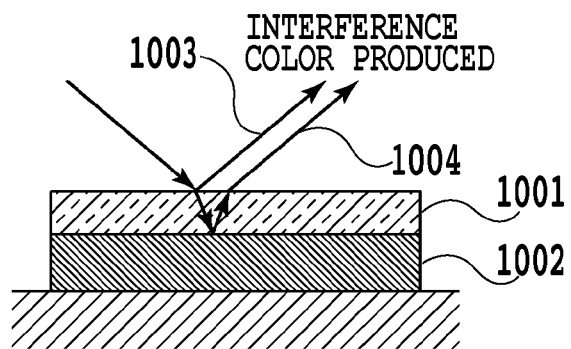
FIG.2A  FIG.2B
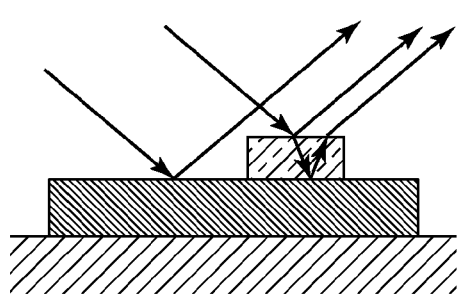
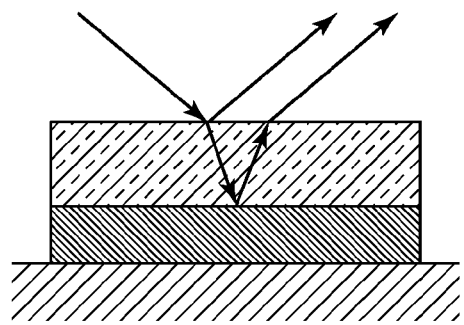
FIG.2C  FIG.2D

PROCESSING AND PRINTING APPARATUS, AND PROCESSING METHOD FOR SUPPRESSING BRONZING IN A PRINTED IMAGE

BACKGROUND OF THE INVENTION

1. Field of the Invention

The present invention relates to an image processing apparatus, an inkjet printing apparatus and a image processing method, and more particularly, to technology that suppresses bronzing in a printed image using what is called clear ink, which substantially does not contain color material.

2. Description of the Related Art

A technology for suppressing bronzing is known in which the bronzing is reduced by controlling the usage amount of color inks, as described in Japanese Patent Laid-Open No. 2001-138555. Specifically, whether or not bronzing will occur is determined based on the lightness of the image to be printed and the ink usage amounts, and bronzing is suppressed by changing the ink usage amounts according to the determination result.

Typically, when observing printed material, an observer observes light that was radiated onto the printed material from a light source and then reflected from the printed material. The observed color differs according to the observation angle. FIG. 1 is a diagram for explaining the difference in two types of reflected light in the case of observing printed material from two different angles. In FIG. 1, the reflected light observed in the direction A is specular light as observed from a direction of specular reflection with respect to the light source, and an image of the light source appearing on the printed material is observed. On the other hand, the reflected light observed in the direction B is reflected light that passed through the printed material and reflected out, or in other words diffuse light, and a color reproduced by the color material is observed. Also, in the case of observing the printed material from the direction A, the light source may be recognized as appearing in a different color from the color of the light source. This is perceived as bronzing.

The method described in the above Japanese Patent Laid-Open No. 2001-138555 has the following problems when observing such printed material. Different tints in the two types of observed light illustrated in FIG. 1 provide feeling of strangeness to the observer. Typically, printing with cyan ink causes a comparatively large difference in the tints in the two types of observed light, and the perception of the specular light becomes a red color different from cyan. In this case, when reproducing the high saturation color of cyan that is one of three primary colors, substituting this cyan with ink of a different color is difficult. For this reason, the technology of changing the usage amount of color inks described in Japanese Patent Laid-Open No. 2001-138555 cannot be applied.

Regarding differences in the tint of observed light as above, the use of clear ink which does not contain color material is known as a technology enabling a reduction in the tint differences of specular light while suppressing bronzing. FIGS. 2A to 2D are diagrams explaining the principle of suppressing bronzing by applying clear ink to printed material after image formation. FIG. 2A illustrates how light reflects normally off the surface of the colored ink layer. Note that for the sake of simplicity, light that is transmitted through the colored ink layer and reflected off surface of the print medium has been omitted. In contrast, FIG. 2B illustrates the case of forming a uniform clear ink layer over the colored ink layer. There exist light 1003 that reflects off the surface of the clear ink layer 1001, and light 1004 that passes through the clear ink layer 1001, reflects off the surface of the cyan colored ink layer 1002, and exits out from the clear ink layer 1001. The light path length of the light 1004 is longer than the light 1003 by a distance equivalent to passing through the clear ink layer 1001. The shift in optical phase based on the light path difference strengthens or weakens the intensity at a specific wavelength to produce light interference, and the tints of bronzing become different. Utilizing this phenomenon, changing the clear ink use amount can vary the coverage of clear ink over the colored ink layer and the thickness of the clear ink layer (see FIGS. 2C and 2D). Thus, the light interference state can be varied to control hues of bronzing color.

However, even though it may be possible to control the optical interference state and bronze hues to some extent by modifying clear ink application amounts, the problem of color change due to bronze colors and the optical interference state related to bronzing may not be resolved in some cases.

More specifically, the optical interference state and bronze colors are caused by further enhancing and blurring color formed by colored ink. This is because colors specified as the same color in the gamut are actually perceived as different colors by an observer. As a result, if image data is generated on the basis of just the colorimetry values associated with the gamut as in the related art, and an image is printed on the basis of such image data, the observer may perceive unnatural color differing from the expected color. In this case, if the application amounts of clear ink and ink or the number of scans by a print head for completing printing on a unit area differ among a plurality of print modes, differences will occur in the way that the clear ink functions and the degree to which clear ink suppresses the above color change due to bronze colors and the optical interference state. As a result, the image colors actually perceived by the observer will appear differently among different modes.

SUMMARY OF THE INVENTION

The present invention is to provide an image processing apparatus, an inkjet printing apparatus, and an image processing method that are able to suppress differences in the color change due to bronze colors and the optical interference state related to bronzing among multiple print modes.

In a first aspect of the present invention there is provided an image processing apparatus that generates print data used by a printing unit which is capable of applying colored ink and clear ink to a print medium and performs relative scan plurality of times to a predetermined area on the print medium, so as to print an image, the apparatus comprising: a gamut converting unit configured to perform conversion of an image data so that a predetermined gamut is converted into a gamut which the printing unit is able to reproduce; and a print data generating unit configured to generate respective print data for a first print mode that applies the colored ink without applying the clear ink in a last scan to the predetermined area and a second print mode that applies the clear ink without applying the colored ink in a last scan to the predetermined area, based on the image data, wherein the gamut converting unit performs the conversion so that a hue of a predetermined color in the predetermined gamut, the predetermined color being printed by executing the first print mode is different from a hue of the predetermined color in the predetermined gamut, the predetermined color being printed by executing the second print mode.

In a second aspect of the present invention there is provided an ink jet printing apparatus that is capable of applying colored ink and clear ink to a print medium and performs relative scan plurality of times to a predetermined area on the print medium, so as to print an image, the apparatus comprising: a printing unit configured to be capable of executing a first print mode that applies the colored ink without applying the clear ink in a last scan to the predetermined area and a second print mode that applies the clear ink without applying the colored ink in a last scan to the predetermined area, wherein the printing unit performs printing so that images printed based on image data showing a predetermined color are measured as different colors between the first and second print modes.

In a third aspect of the present invention there is provided an image processing method of generating print data used by a printing unit which is capable of applying colored ink and clear ink to a print medium and performs relative scan plurality of times to a predetermined area on the print medium, so as to print an image, the apparatus comprising: a gamut converting step of performing conversion of an image data so that a predetermined gamut is converted into a gamut which the printing unit is able to reproduce; and a print data generating step of generating respective print data for a first print mode that applies the colored ink without applying the clear ink in a last scan to the predetermined area and a second print mode that applies the clear ink without applying the colored ink in a last scan to the predetermined area, based on the image data, wherein the gamut converting step performs the conversion so that a hue of a predetermined color in the predetermined gamut, the predetermined color being printed by executing the first print mode is different from a hue of the predetermined color in the predetermined gamut, the predetermined color being printed by executing the second print mode.

According to the above configuration, it becomes possible to suppress differences in color change due to bronze colors and the optical interference state related to bronzing among multiple print modes.

Further features of the present invention will become apparent from the following description of exemplary embodiments (with reference to the attached drawings).

BRIEF DESCRIPTION OF THE DRAWINGS

FIGS. 2A to 2D are diagrams explaining the principle of suppressing bronzing by applying clear ink to printed material after image formation;

DESCRIPTION OF THE EMBODIMENTS

Hereinafter, embodiments of the present invention will be described in detail and with reference to the attached drawings.

(Bronzing Evaluation Method)

Before describing the embodiment of the present invention, a method of evaluating bronzing will be described. Bronzing may be measured using the Gonio-Spectrophotometric Color Measurement System (GCMS-4) from Murakami Color Research Laboratory, for example. A printed image is irradiated with light from a 45° angle, and by sensing light at a 45° position in the opposite direction, the spectral intensity of the specular light is measured. The chroma of the specular light is then computed from the measured spectral intensity. The less the specular light is colored, the smaller the measured value for the chroma of the specular light becomes.

Figure 1:
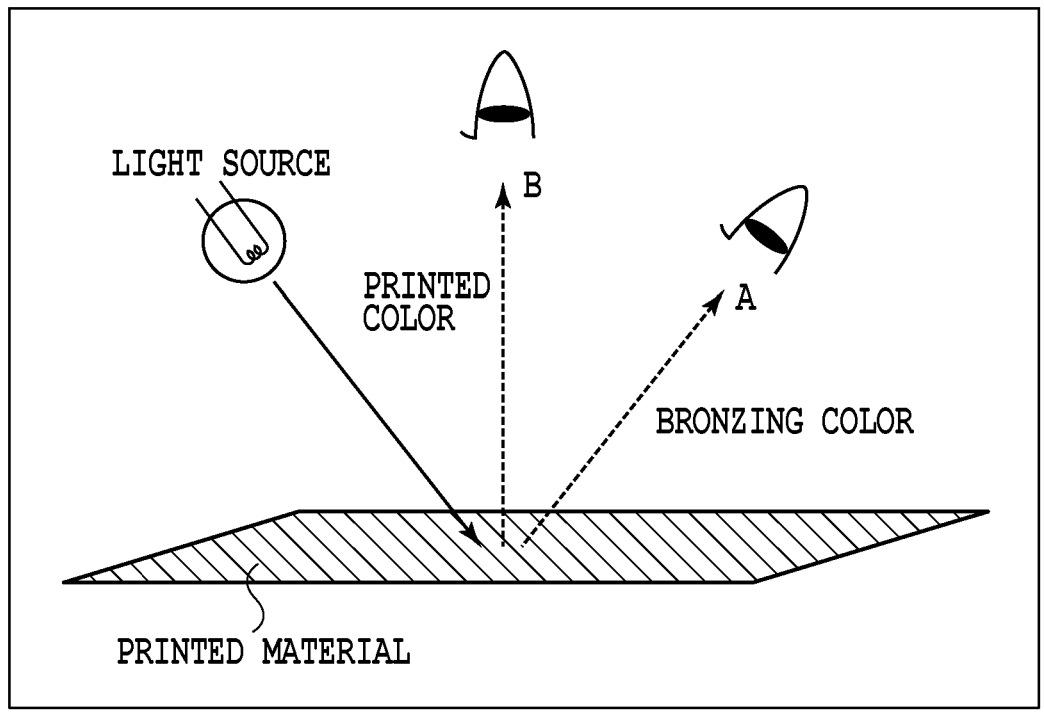
FIG. 1 is a diagram for explaining the difference in two types of reflected light in the case of observing printed material from two different angles.
Figure 3:
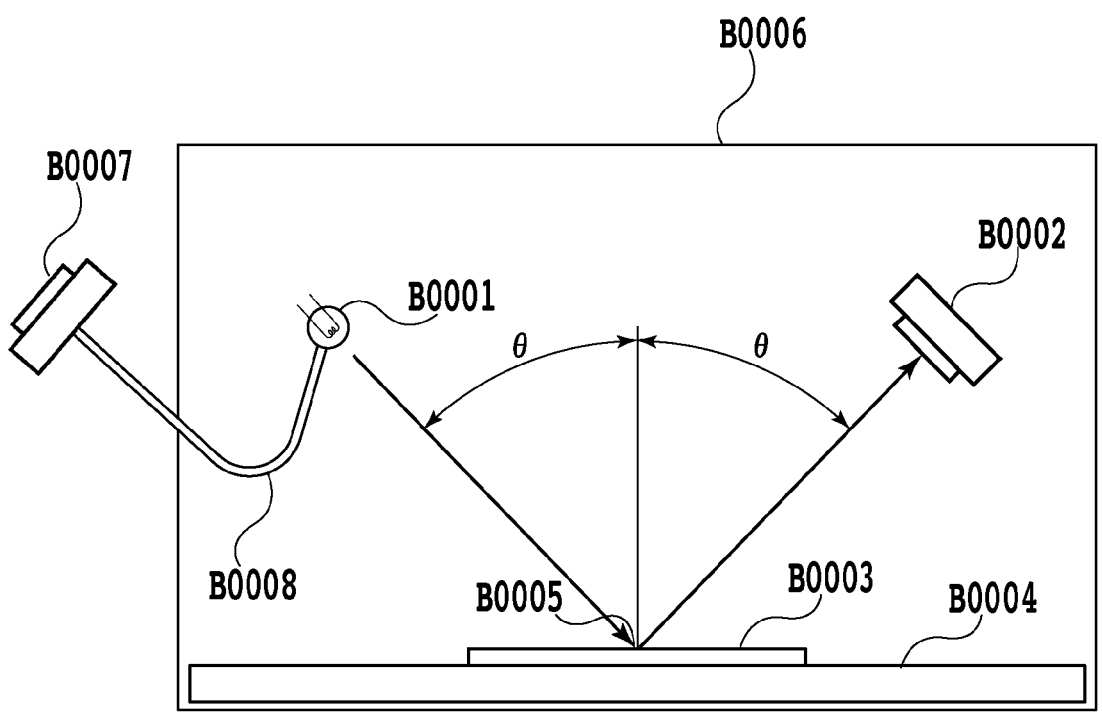
FIG. 3 is a diagram that schematically illustrates a bronze measuring system.

FIG. 3 is a diagram that schematically illustrates a measuring system. In FIG. 3, B0001 represents lighting equipment that illuminates a print medium B0003 to be evaluated. B0002 represents a photodetector that detects reflected light from the print medium B0003 to be evaluated. The photodetector B0002 is positioned opposite the lighting equipment at the same tilt angle θ with respect to the normal line of the print medium B0003, or in other words, the direction of specular reflection. B0004 represents a stationary platform that holds the print medium B0003 in place, upon which is printed a patch to be evaluated. B0005 represents a measurement site measured by the photodetector B0002. B0006 illustrates alight shielding member for shutting out external light.

The spectral intensity of specular light from the print medium B0003 measured by the photodetector B0002 may be expressed as:

$$R_X(\lambda).$$

Tristimulus values Xx, Yx, Zx for the specular light are computed from the spectral intensity. In addition, from the specular tristimulus values of the print medium B0003 to be evaluated as detected by the photodetector B0002 and the tristimulus values of the lighting B0001, specular L*a*b* values for the print medium is computed on the basis of JIS Z 8729.

Figure 4:
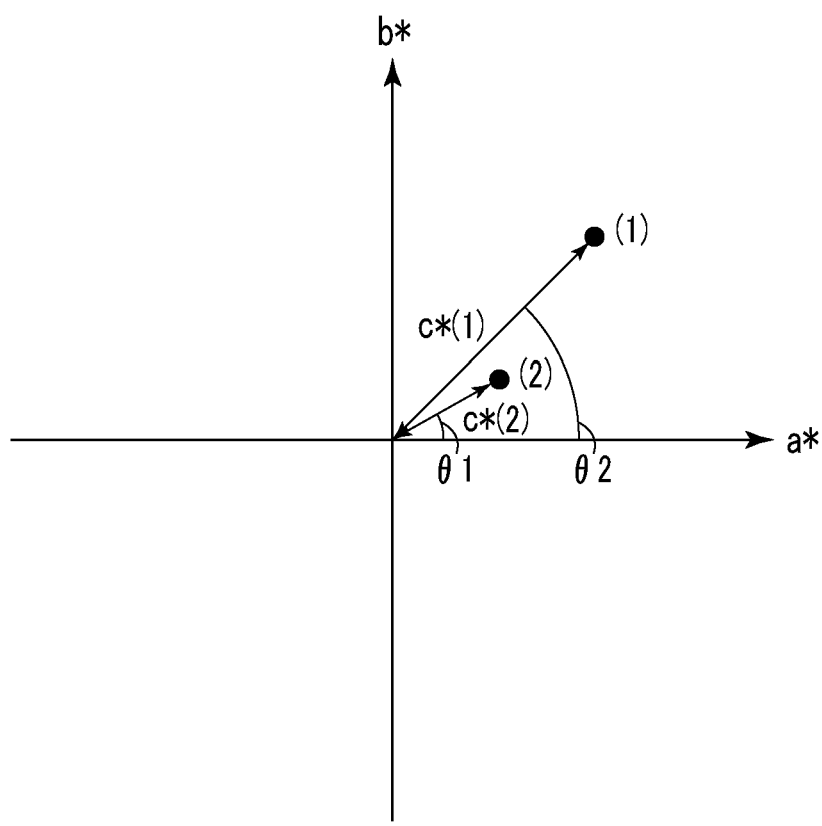
FIG. 4 is a diagram plotting the results of measuring two colors on a printed surface according to the above measuring method onto the a*b* plane.

FIG. 4 is a diagram illustrating, on the a*b* plane, L*a*b* values obtained as a result of respectively measuring two colors on a printed surface according to the above measuring method. The point labeled (1) in FIG. 4 represents a plot of the L*a*b* values (specular values; hereinafter also called the bronzing color) obtained as a result of measuring a color with a noticeable bronzing appearance, while the point labeled (2) represents a plot of the bronzing color for a color having a comparatively less noticeable bronzing appearance. C*(1) and C*(2) indicate the results of calculating the chroma C*=sqrt (a*^2+b*^2) from the L*a*b* values of these bronzing colors. A larger C* value indicates a bronzing color with greater chroma, which is more noticeable as bronzing. Also, in FIG. 4, θ1 and θ2 are obtained by calculating the hue angle θ=tan−1(a*/b*) from the L*a*b* of the bronzing colors. By computing the hue and chroma of such bronzing colors on the a*b* plane in this way, similarly to the L*a*b* of diffuse light when measuring ordinary color, it is possible to quantify bronzing.

(Apparatus Configuration)

Figure 5:
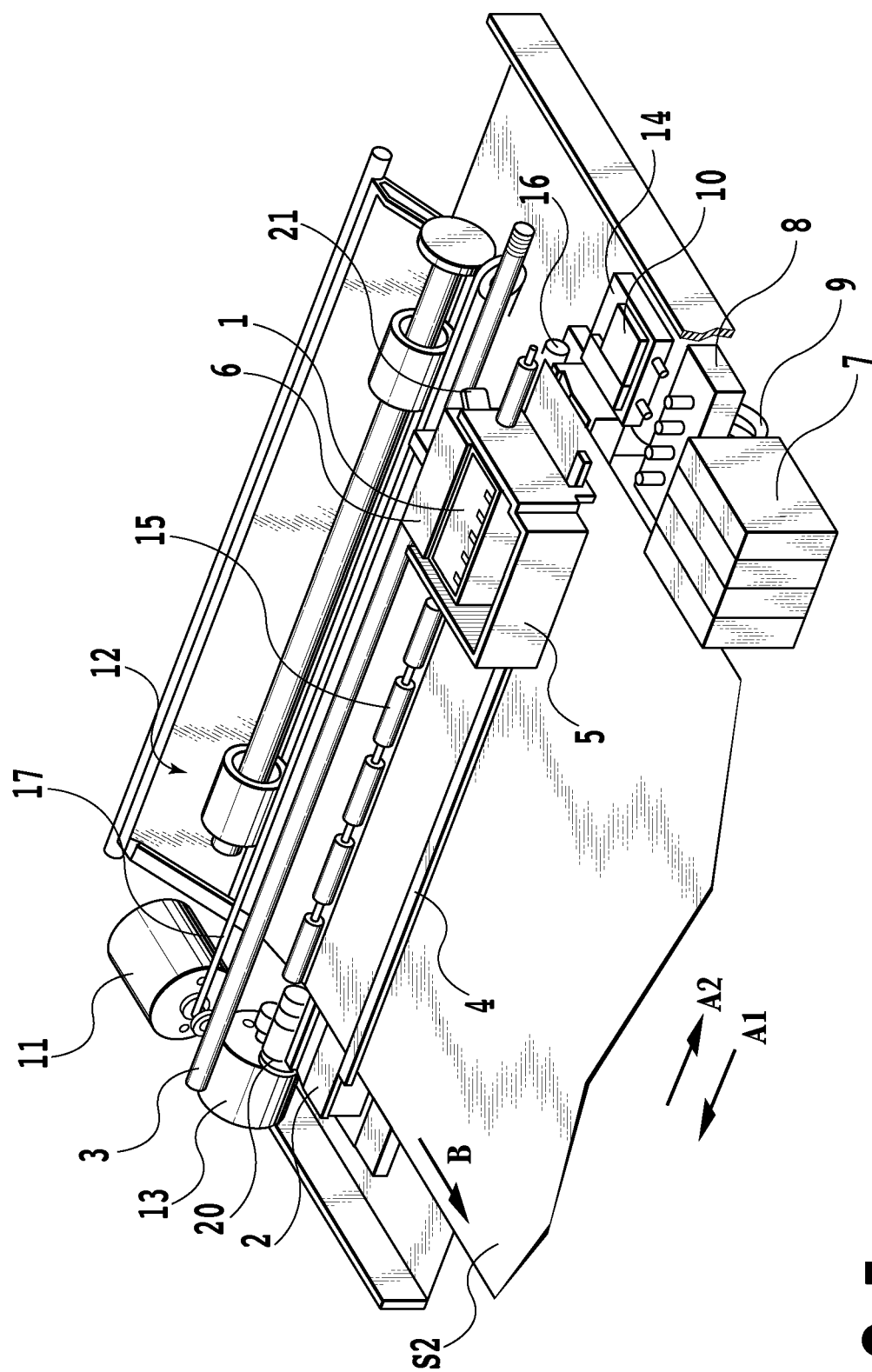
FIG. 5 is a perspective view illustrating a configuration of an inkjet printing apparatus according to an embodiment of the present invention.

FIG. 5 is a perspective view illustrating a configuration of an inkjet printing apparatus according to an embodiment of the present invention. After inserting a print medium via a feed tray 12, the printing apparatus of the present embodiment prints an image or the like while intermittently conveying the print medium in the direction indicated by the arrow B, and discharges the print medium into a discharge tray.

The print head 1 mounted on the carriage 5 is able to print an image onto a print medium S2 by ejecting ink from nozzles provided on the print head while moving along a guide rail 4 in the direction of the arrows A1 and A2. The print head 1 includes, for example, multiple nozzle groups corresponding to respectively different colors of ink. For example, there may be nozzle groups for ejecting a total of 10 colors: the colored inks cyan (C), magenta (M), yellow (Y), light cyan (LC), light magenta (LM), red (R), photo black (PBk), gray (Gy), and matte black (MBk), and clear ink (CL; ink that substantially does not contain color material). Inks for these respective colors, including clear ink, are stored in ink tanks (not illustrated), and supplied to the print head 1 from these ink tanks. Also, the ejection volume of the print head 1 is approximately the same for each color, at 4 pl (pico-little). Additionally, in the present embodiment, the ink tanks and the print head 1 are integrated to constitute a head cartridge 6, with the head cartridge 6 mounted onto the carriage 5.

By transferring driving force from a carriage motor 11 to the carriage 5 with a timing belt 17, the carriage 5 is made to move back and forth along a guide axle 3 and the guide rail 4 in the direction of the arrows A1 and A2 (the main scan direction). During this carriage movement, the position of the carriage 5 is detected by an encoder sensor 21 provided on the carriage 5 reading a linear scale 19 provided along the carriage movement direction. In addition, a print medium is printed on by ejecting ink from the nozzles of the print head at timings corresponding to the detected signal. For every scan of the print head, the print medium S2 supplied by the feed tray 12 is conveyed by a given amount. In other words, the print medium S2 is held between a conveyance roller 16 and a pinch roller 15, and in addition, is conveyed by a given amount in the direction of the arrow B (the sub-scan direction) due to the conveyance roller 16 being driven by the driving force from a conveyance motor 13 via a linear wheel 20. A head cap 10 and a recovery unit 14 are provided at a home position provided at an edge of the print head's movement range, and a recovery process for the print head 1 is intermittently conducted as necessary.

When the printing for a single sheet of print medium finishes by repeating the operations described above, the print medium is discharged, thus completing the printing of a single sheet. At this time, in a printing mode that uses the clear ink CL, printing is conducted with bidirectional scans indicated by the arrows A1 and A2, for example, in accordance with the arrangement of nozzle arrays for the 10 colors of ink in the print head, as discussed later with drawings such as FIG. 14. Also, with the multi-pass printing discussed later with drawings such as FIG. 8, the clear ink CL is ejected afterwards onto the areas printed with colored inks. By controlling the respective amounts of the clear ink CL ejected before and after printing with these colored inks, it becomes possible to reduce bronzing.

(Ink Composition)

The respective components constituting the pigment inks used by the inkjet printing apparatus of the present embodiment will now be described.

(Aqueous Medium)

An aqueous medium containing water and a water-soluble organic solvent is preferably used for the inks used in the present invention. The content of water-soluble organic solvent in each of the inks (mass percentage) is preferably between 3.0% w/w and 50.0% w/w inclusive with respect to the total mass of the ink. Additionally, the content of water in each of the inks (mass percentage) is preferably between 50.0% w/w and 95.0% w/w inclusive with respect to the total mass of the ink.

Specifically, potential examples of substances usable as the water-soluble organic solvent include: C1-C6 alkyl alcohols such as methanol, ethanol, propanol, propanediol, butanol, butanediol, pentanol, pentanediol, hexanol, and hexanediol; amides such as dimethylformamide and dimethylacetamide; ketones or ketoalcohols such as acetone and diacetone alcohol; ethers such as tetrahydrofuran and dioxane; polyalkylene glycols such as polyethylene glycol, polypropylene glycol and others with mean molecular weights of 200, 300, 400, 600, and 1000; alkylene glycols having a C2-C6 alkylene base, such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerine; lower alkyl ethers of polyalcohols, such as ethylene glycol monomethyl (or ethyl)ether, diethylene glycol methyl (or ethyl) ether, or triethylene glycol monomethyl (or ethyl)ether; and N-methyl-2-pyrrolidone, 2-pyrrolidone, and 1,3-dimethyl-2-imidazolidinone. Also, deionized water (ion-exchanged water) is preferably used as the water.

(Pigment)

Carbon black and organic pigments are preferably used as the pigments. The content of pigment in each of the inks (mass percentage) is preferably between 0.1% w/w and 15.0% w/w inclusive with respect to the total mass of the ink.

For the black ink, carbon black such as furnace black, lampblack, acetylene black, or channel black is preferably used. Specifically, potential examples of commercially available products which may be used include: Raven 7000, 5750, 5250, 5000 Ultra, 3500, 2000, 1500, 1250, 1200, 1190 Ultra II, 1170, and 1255 (Columbian); Black Pearls L, Regal 300R, 400R, and 660R, Mogul L, Monarch 700, 800, 880, 900, 1000, 1100, 1300, 1400, and 2000, and Vulcan XC-72R (Cabot); Color Black FW1, FW2, FW2V, FW18, FW200, 5150, 5160, and 5170, Printex 35, U, V, 140U, and 140V, Special Black 6, 5, 4A, and 4 (Degussa); and No. 25, No. 33, No. 40, No. 47, No. 52, No. 900, No. 2300, MCF-88, MA600, MA7, MA8, and MA100 (Mitsubishi Chemical). Carbon black newly prepared for the present invention may also be used. Obviously, the present invention is not limited to the above, and any carbon black of the related art may be used. Furthermore, the present invention is not limited to any carbon black, and substances such as magnetite or ferrite magnetic nanoparticles, and titanium black may also be used as pigment.

Specific examples of organic pigments include: water-insoluble azo pigments such as Toluidine Red, Toluidine Maroon, Hansa Yellow, Benzidine Yellow, and Pyrazolone Red; water-soluble azo pigments such as Lithol Red, Helio Bordeaux, Pigment Scarlet, and Permanent Red 2B; vat dye derivatives such as Alizarin, Indanthrone, and Thioindigo Maroon; phthalocyanine-based pigments such as Phthalocyanine Blue and Phthalocyanine Green; quinacridone-based pigments such as Quinacridone Red and Quinacridone Magenta; perylene-based pigments such as Perylene Red and Perylene Scarlet; isoindolinone-based pigments such as Isoindolinone Yellow and Isoindolinone Orange; imidazolone-based pigments such as Benzimidazolone Yellow, Benzimidazolone Orange, and Benzimidazolone Red; pyranthrone-based pigments such as Pyanthrone Red and Pyranthrone Orange; indigo-based pigments, condensed azo pigments, thioindigo-based pigments, and diketo-pyrrolopyrrole-based pigments; and Flavanthrone Yellow, Acylamido Yellow, Quinoline Yellow, Nickel Azo Yellow, Copper Azomethine Yellow, Perinone Orange, Anthrone Orange, Dianthraquinonyl Red, and Dioxazine Violet. Obviously, the present invention is not limited to the above.

Furthermore, when expressing organic pigments by color index (C.I.) numbers, examples of usable pigments include: C.I. Pigment Yellow 12, 13, 14, 17, 20, 24, 74, 83, 86, 93, 97, 109, 110, 117, 120, 125, 128, 137, 138, 147, 148, 150, 151, 153, 154, 166, 168, 180, and 185; C.I. Pigment Orange 16, 36, 43, 51, 55, 59, 61, and 71; C.I. Pigment Red 9, 48, 49, 52, 53, 57, 97, 122, 123, 149, 168, 175, 176, 177, 180, 192, 215, 216, 217, 220, 223, 224, 226, 227, 228, 238, 240, 254, 255, and 272; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26. Obviously, the present invention is not limited to the above.

(Dispersant)

Any water-soluble plastic may be used as a dispersant to disperse pigments such as the above in the aqueous medium. More particularly, the dispersant preferably has a weight-average molecular weight between 1,000 and 30,000 inclusive, and more preferably between 3,000 and 15,000 inclusive. The content of dispersant in each of the inks (mass percentage) is preferably between 0.1% w/w and 5.0% w/w inclusive with respect to the total mass of the ink.

Specifically, potential examples of substances usable as the dispersant include: styrene, vinylnaphthalene, aliphatic alcohol esters of ethylene/$\alpha,\beta$-unsaturated carboxylic acid, acrylic acid, maleic acid, itaconic acid, fumaric acid, vinyl acetate, vinyl pyrolidone, acrylamide, and polymers taking derivatives thereof as monomers. Note that one or more of the monomers constituting a polymer is preferably a hydrophilic monomer, and a block copolymer, random copolymer, graft copolymer, or any of their salts may be used. Alternatively, a natural resin such as rosin, shellac, or starch may also be used. Such resins are preferably soluble in an aqueous solution with a dissolved base, or in other words, are alkali-soluble.

(Surfactant)

In order to adjust the surface tension of the inks constituting the ink set, it is preferable to use a surfactant such as an anionic surfactant, a non-ionic surfactant, or an amphoteric surfactant. Specifically, substances such as polyoxyethylene alkyl ether, polyoxyethylene alkyl phenols, acetylenic glycol compounds, and acetylenic glycol ethylene oxide adducts may be used.

(Other Components)

Besides the above components, the inks constituting the ink set may also contain moisture-retaining solids such as urea, urea derivatives, trimethylolpropane, and trimethylolethane in order to stay moist. The content of moisture-retaining solids in each of the ink (mass percentage) is preferably between 0.1% w/w and 20.0% w/w inclusive, and more preferably between 3.0% w/w and 10.0% w/w inclusive with respect to the total mass of the ink. In addition, the inks constituting the ink set may also contain various additives other than the above components as necessary, such as pH adjusters, anticorrosive agents, preservatives, mold inhibitors, antioxidants, anti-reduction agents, and evaporation accelerators.

Next, the inks used in the present embodiment will be specifically described. The present invention is not limited by the following embodiment insofar as the principle matter thereof is not exceeded. Note that the terms "parts" and "%" herein are based on mass, unless specifically noted otherwise.

(Preparation of Resin Solution A)

A random copolymer with an acid value of 288 mg KOH/g, a weight-average molecular weight of 10,000, and a monomer composition of styrene/n-butyl acrylate/acrylic acid=23/37/37 was neutralized to 1 equivalent with potassium hydroxide. After that, the solution was adjusted with water to reach a resin concentration of 10.0% and obtain a resin solution A.

(Preparation of Resin Solution B)

A resin solution B was prepared similarly to the preparation of the resin solution A, except that a random copolymer with an acid value of 288 mg KOH/g, a weight-average molecular weight of 10,000, and a monomer composition of styrene/n-butyl acrylate/acrylic acid=23/37/37 was used instead of the styrene/acrylic acid random copolymer with an acid value of 200 mg KOH/g, a weight-average molecular weight of 10,000 that was used in the resin solution A.

(Preparation of Pigment Dispersions 1 to 4)

Pigment dispersions 1 to 4 were prepared according to the procedure indicated below.

<Preparation of Pigment Dispersion 1 Containing C.I. Pigment Red 122>

10 parts pigment (C.I. Pigment Red 122) were mixed with 20 parts resin solution A and 70 parts ion-exchanged water, and dispersed for three hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 1 with a pigment concentration of 10% w/w.

<Preparation of pigment dispersion 2 containing C.I. Pigment Blue 15:3>

10 parts pigment (C.I. Pigment Blue 15:3) were mixed with 20 parts resin solution A and 70 parts ion-exchanged water, and dispersed for five hours using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 2 with a pigment concentration of 10% w/w.

<Preparation of Pigment Dispersion 3 Containing C.I. Pigment Yellow 74>

10 parts pigment (C.I. Pigment Yellow 74) were mixed with 20 parts resin solution A and 70 parts ion-exchanged water, and dispersed for one hour using a batch-type vertical sand mill. After that, coarse particulate was removed by a centrifugation process. Additionally, the mixture was filtered under pressure through a cellulose acetate filter (Advantec) with a pore size of 3.0 μm to obtain the pigment dispersion 3 with a pigment concentration of 10% w/w.

<Preparation of Pigment Dispersion 4 Containing C.I. Pigment Black 7>

10 parts carbon black pigment (C.I. Pigment Black 7) were mixed with 20 parts resin solution A and 70 parts ion-exchanged water, and dispersed for three hours using a batch-type vertical sand mill. Note that the circumferential velocity during the dispersion was twice that during the preparation of the pigment dispersion 1. After that, coarse particulate was removed by a centrifugation process. Additionally, the mixture was filtered under pressure through a cellulose acetate filter (Advantec) with a pore size of 3.0 to obtain the pigment dispersion 4 with a pigment concentration of 10% w/w.

(Preparation of Ink)

After mixing and sufficiently stirring the respective components indicated in Table 1, the mixtures were filtered under pressure through a cellulose acetate filter (Advantec) with a pore size of 0.8 μm to prepare the colored inks 1 to 7 and clear ink.

However, the composition of the clear ink CL is not limited to the above. The clear ink CL is an ink that covers pigment color material remaining on a sheet surface in order to prevent bronzing. As described using FIGS. 2A-2D, the clear ink CL application amount can be changed to vary the coverage of clear ink over the colored ink layer and the thickness of the clear ink layer. With this clear ink layer, the optical interference state can be varied to control bronze colors. Consequently, the clear ink CL may have different types of resins and amounts of resin additives insofar as the effect of controlling the index of refraction of light is obtained.

In addition, an ink with low surface tension may be adopted as clear ink able to control gloss by controlling the state of the surface. Herein, a high-penetration ink with high permeation into a print medium is given as a typical ink model meeting these conditions. The surface tension in this case is approximately between 30 mN/m and 37 mN/m inclusive. Note also that an ink whose numerical value falls below 30 mN/m may still be adopted without problems if mist or other phenomena do not dirty the body of the printer. After regulating the ink temperature to 25° C., the surface tension can be measured using an Automatic Surface Tensiometer CBVP-Z (Kyowa Interface Science).

Figure 6:
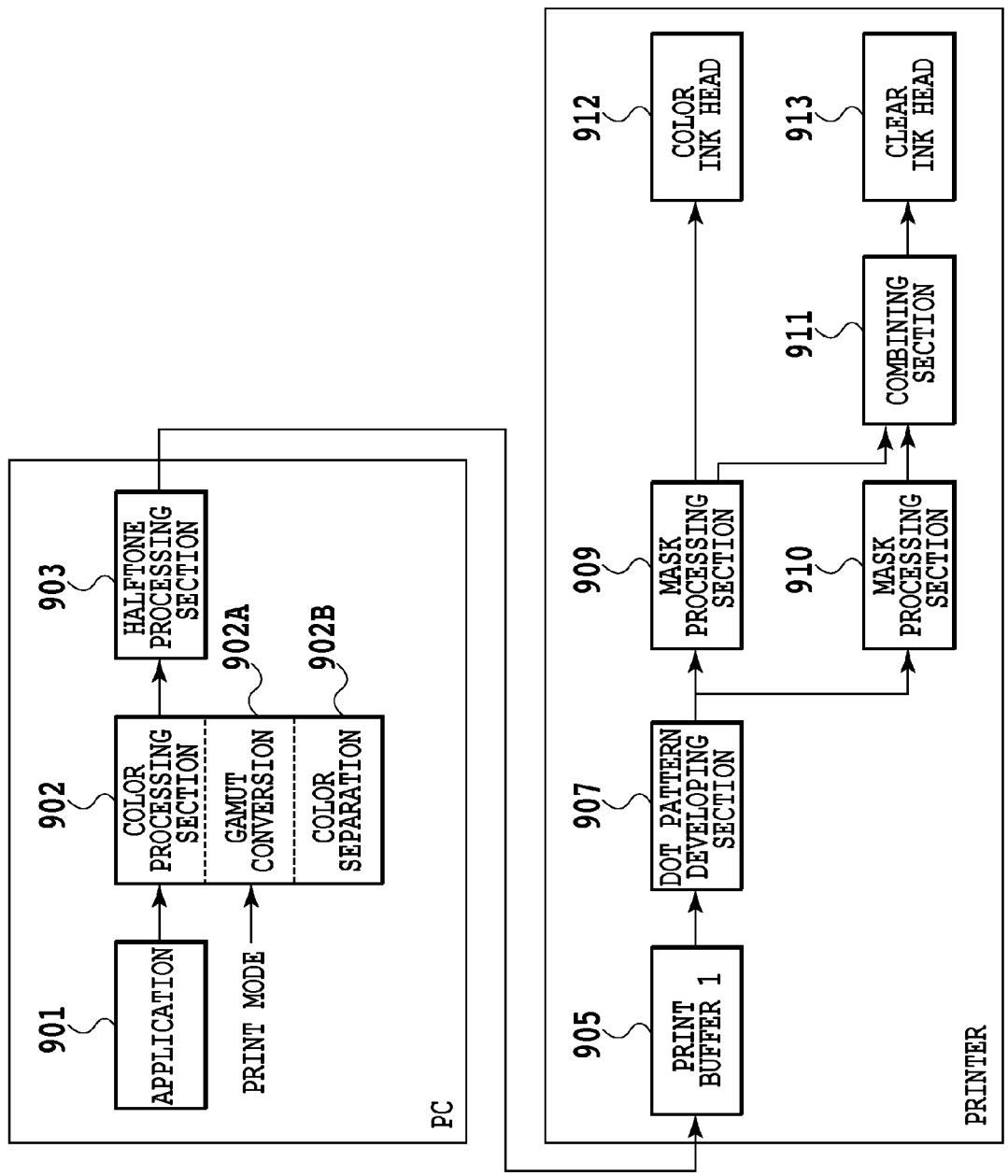
FIG. 6 is a block diagram illustrating an image processing configuration in a printing system made up of an inkjet printing apparatus according to an embodiment of the present invention and a personal computer (PC) that acts as the host device thereof.

FIG. 6 is a block diagram illustrating an image processing configuration in a printing system made up of an inkjet printing apparatus according to an embodiment of the present invention and a personal computer (PC) that acts as the host device thereof. Note that image processing executed by the printing system illustrated in FIG. 6 is realized by control and processing elements in the PC and the printer acting as a printing unit, respectively. Note also that application of the present invention is obviously not limited to this embodiment. For example, the image processing components up to the combining section illustrated in FIG. 6 may be incorporated into the PC, or alternatively, the image processing configuration of the color processing section and thereafter may be incorporated into the printer. In this specification, these image processing components and image processing configurations are called an image processing apparatus.

Image data processed by an application 901 on the PC is input into a color processing section 902 also on the PC as RGB image data with 8 bits per color, for a total of 24 bits. First, the color processing section 902 performs conversion (gamut mapping) 902A from the gamut of the standard RGB color space of the above image data to the gamut of the device color space reproducible by the printer of the present embodiment, as discussed later with FIG. 17. Specifically, the color processing section 902 performs gamut conversion using a profile (table) corresponding to the selected print mode. Next, the color processing section 902 performs color separation 902B on the RGB image data obtained by the gamut conversion by using color conversion tables discussed later with FIGS. 15A and 15B. More specifically, the color processing section 902 converts the RGB image data into image data (ink application amount data) made up of signals for the colors C, M, Y, LC, LM, R, PBk, GY, and MBk of the colored inks as well as a first signal CL1 and a second signal CL2 for clear ink, used by the inkjet printing apparatus. As discussed later with FIGS. 10 and 11, the clear ink signal CL1 constitutes image data (first usage amount data) for printing by ejecting clear ink onto the same area during the same scan as colored ink. Meanwhile, the signal CL2 constitutes image data (second usage amount data) for ejecting clear ink onto the same area as the above, but during a scan later than the scan that prints with the colored ink.

The halftone processing section 903 performs a halftoning process such as error diffusion to convert a multi-level input signal with 12 bits per color, or 4096 values, into N-valued data that is less than 4096 values. Specifically, the N value is multi-level, with 2 to 4 bits per color, for approximately 3 to 16 values. Note that although the present embodiment illustrates an example of halftoning that yields multi-level data, the configuration is not limited thereto, and halftoning that yields binary data is also acceptable.

The halftone-processed, N-valued image data from the PC is forwarded to the inkjet printing apparatus (printer) and stored in a print buffer 905. A dot pattern developing section

TABLE 1

| | | Ink | | | | | | | |
|---|---|---|---|---|---|---|---|---|---|
| | | 1 | 2 | 3 | 4 | 5 | 6 | 7 | 8 |
| Pigment dispersion | 1 | 40 | 10 | | | | | | |
| | 2 | | | 40 | 10 | | | | |
| | 3 | | | | | 40 | | | |
| | 4 | | | | | | 30 | 10 | |
| Resin solution B | 5 | | | | | | | | 1 |
| Glycerin | | 5.0 | 5.0 | 5.0 | 5.0 | 5.0 | 5.0 | 5.0 | 5.0 |
| Diethylene glycol | | 5.0 | 5.0 | 5.0 | 5.0 | 5.0 | 5.0 | 5.0 | 5.0 |
| Polyethylene glycol 1000 | | 5.0 | 5.0 | 5.0 | 5.0 | 5.0 | 5.0 | 5.0 | 5.0 |
| Surfynol 465 | | 1.0 | 1.0 | 1.0 | 1.0 | 1.0 | 1.0 | 1.0 | 1.0 |
| Ion-exchanged water | | 44 | 74 | 44 | 74 | 44 | 54 | 74 | 83 |
| Ink type | | M | Lm | C | Lc | Y | K | Gy | CL |

Figure 7:
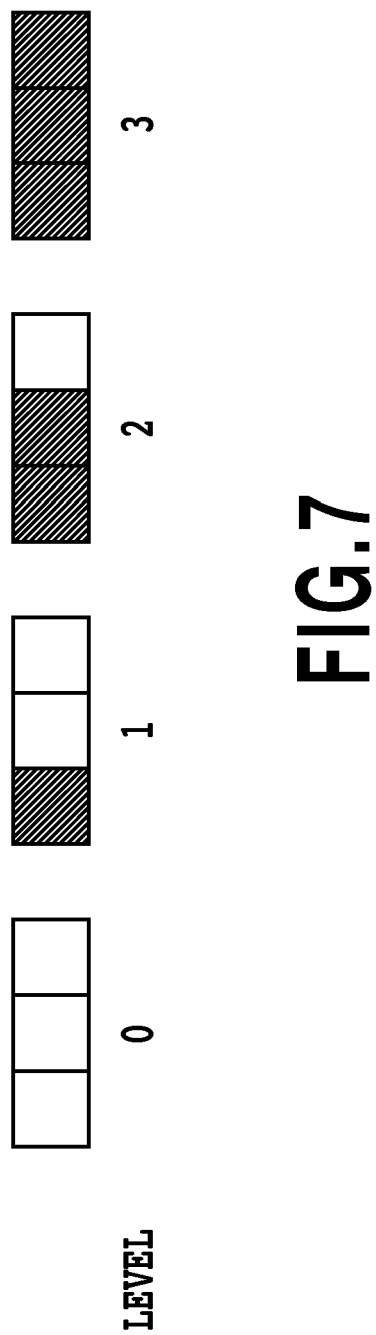
FIG. 7 is a diagram illustrating dot layout patterns for developing dot patterns according to N values.

907 retrieves the N-valued data stored in the print buffer 905, and develops dot patterns according to the N values. FIG. 7 is a diagram illustrating dot patterns. The example depicted in FIG. 7 illustrates dot patterns for the N=4 case, in which dot patterns of 3 pixels×1 pixel are determined in correspondence with each of the levels 0, 1, 2, and 3 expressed by the 4-valued image data. Each pattern represents binary data, in which pixels shaded by black indicate dots which are ON, while white pixels indicate dots which are OFF. In other words, the dot pattern development yields binary data at triple the resolution in the scan direction. Respective dot patterns corresponding to each signal value (pixel value) are similarly developed for the clear ink image data CL1 and CL2, yielding binary data for each.

Next, the mask processing sections 909 and 910 split the binary data for each ink obtained by the dot pattern developing section 907 into data corresponding to multiple scans by the print head over the same printing area. This process is conducted using thinning patterns (hereinafter also referred to as mask patterns). The mask processing section 909 performs mask processes to the data for the colored inks C, M, Y, Lc, Lm, R, PBk, MBk, and Gy as well as the clear ink data CL1, while the mask processing section 910 performs mask processes to the clear ink data CL2, thus generating respective print data.

Figure 8:
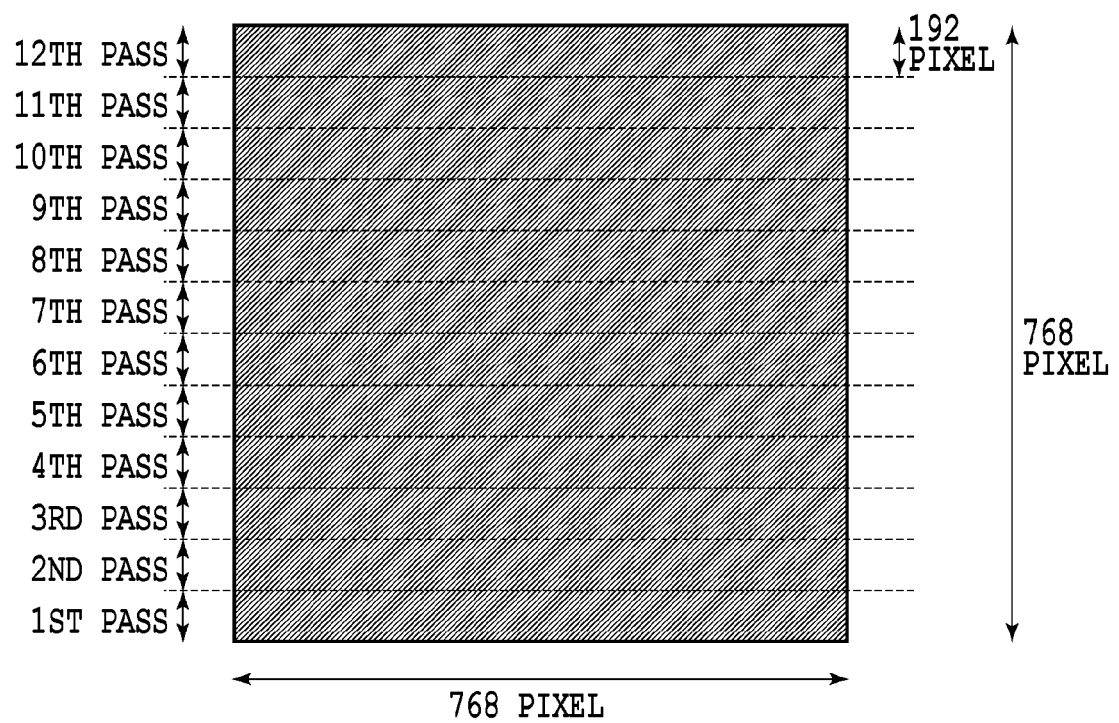
FIG. 8 is a diagram illustrating a typical mask pattern for comparison with a mask pattern of the present embodiment.

FIG. 8 is a diagram illustrating a typical mask pattern for comparison with a mask pattern of the present embodiment. The mask pattern illustrated in FIG. 8 is a mask pattern for 12-pass multi-pass printing, which completes the printing of the same unit area in 12 scans. In this mask pattern, pixels turned ON in a particular pass are represented with black dots while pixels turned OFF are represented with white dots, with the dot layout being determined randomly (such a layout is depicted using gray or hatching in FIG. 8 and subsequent drawings). The vertical-by-horizontal pixel size is 768 pixels by 768 pixels, with the vertical direction corresponding to a nozzle array direction in the print head, and the horizontal direction corresponding to the main scan direction in which the print head scans. Also, the vertical pixel size of 768 corresponds to the 768 nozzles in the print head. As illustrated by broken lines in FIG. 8, dividing the vertical 768 pixels into 12 sections yield divided mask areas (1st pass to 12th pass) having a vertical height of 64 pixels, which correspond to the unit areas whose printing is completed in the above 12 scans. Each of these unit areas are successively printed by varying the nozzles used, on the basis of print data masked by the mask patterns for 1st pass to 12th pass. Furthermore, these mask patterns for 1st pass to 12th pass are mutually complementary. The mask patterns for 1st pass to 12th pass in this example have nearly the same duty, or in other words, a duty of approximately 8.3%.

Figure 9:
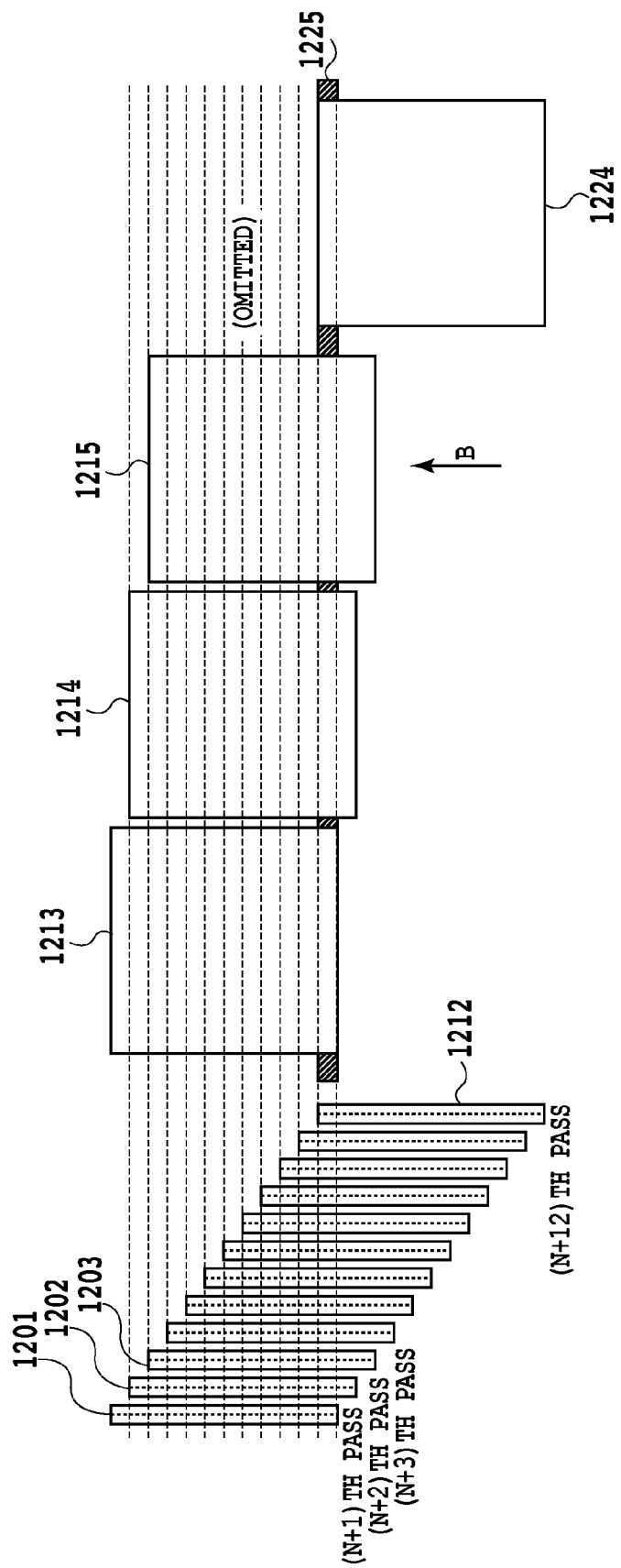
FIG. 9 is a diagram illustrating multi-pass printing using the mask pattern illustrated in FIG. 8.

FIG. 9 is a diagram illustrating multi-pass printing using the mask pattern illustrated in FIG. 8. In FIG. 9, reference numerals 1201 to 1212 indicate the relative positions of the print head (in FIG. 9, the print head is illustrated for only one color for simplicity) to the printing sheet, and reference numeral 1213 to 1225 indicate a single mask pattern associated with a nozzle array in the print head. Note that these mask patterns, although given different reference numerals, represent the same single mask pattern, and illustrate how the position of the corresponding mask pattern also moves together with the above relative movement of the print head. In other words, FIG. 9 illustrates how the divided mask areas of a mask pattern and divided nozzle groups are associated with the unit area 1225, whose printing on the printing sheet is completed as the printing sheet is successively conveyed while conducting 12-pass multi-pass printing. Note that whereas FIG. 9 illustrates the print head and the mask pattern as moving relative to the printing sheet, in actuality the position of the printing sheet moves as the printing sheet is conveyed.

As illustrated in FIG. 9, a scan by the print head (position) 1201 is conducted during the scan of (N+1)-th pass. At this point, the unit area 1225 is printed on the basis of print data generated by the lowermost mask area of the mask pattern 1213, using the lowermost nozzle group from among the nozzle groups obtained by dividing the nozzles on the nozzle array into 12 sections. Next, the printing sheet is conveyed a distance equivalent to the width of the above unit area in the direction of the arrow B in FIG. 9. Then, a scan by the print head (position) 1202 is conducted during the scan of the next (N+2)-th pass, and the unit area 1225 is printed on the basis of print data generated by the second from lowermost mask area of the mask pattern 1214, using the second from lowermost nozzle group from among the nozzle groups. At this point, a separate unit area neighboring the unit area 1225 is also printed on the basis of print data generated by the lowermost neighboring mask area, using the lowermost neighboring nozzle group. Similarly, the printing sheet is conveyed and the print head scans, until a scan by the print head (position) 1212 is conducted during the scan of the (N+12)-th pass, and the unit area 1225 is printed on the basis of print data generated by the twelfth from the lowermost mask area of the mask pattern 1224, using the twelfth from the lowermost (or in other words the uppermost) nozzle group from among the nozzle groups. At this point, the printing of the unit area 1225 is completed.

Figure 10:
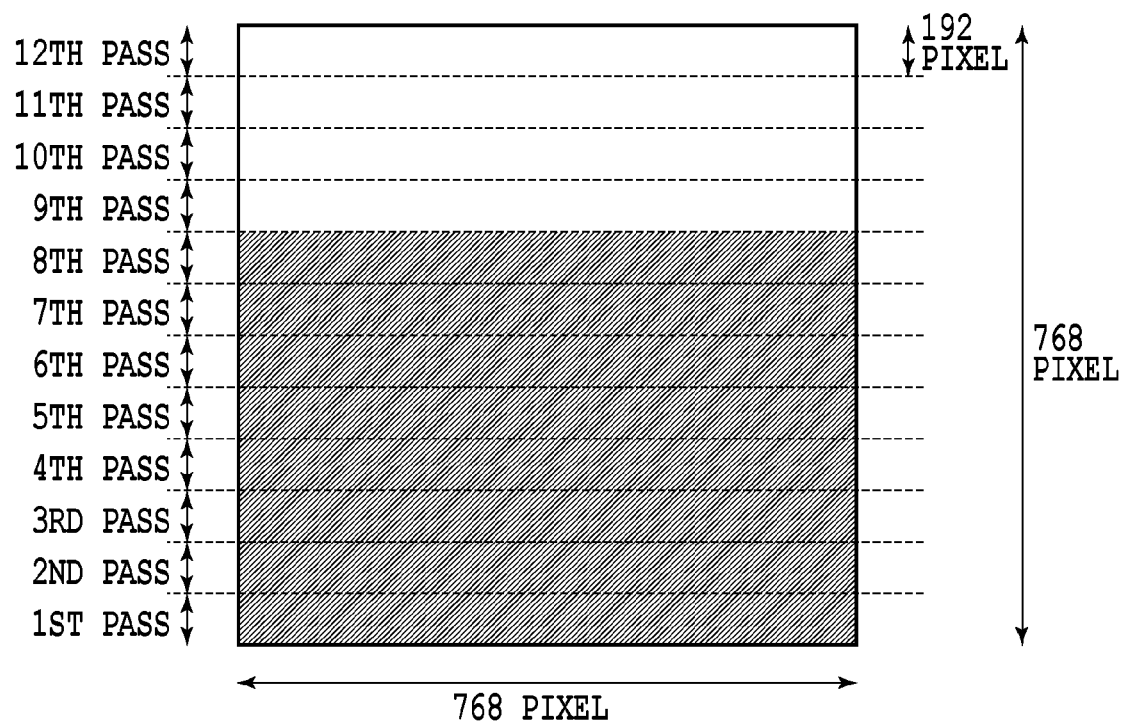
FIG. 10 is a diagram illustrating a mask pattern according to the present embodiment used by a mask processing section 909.

FIG. 10 is a diagram illustrating a mask pattern according to the present embodiment used by the mask processing section 909, which performs mask processes to the colored ink data and the clear ink data CL1. Unlike the typical mask pattern illustrated in FIG. 8, the black ON dots (and the white OFF dots) exist only in the divided mask areas corresponding to 1st pass to 8th pass, with no ON dots in the divided mask areas corresponding to 9th pass to 12th pass. That is, when using this mask, the printing an image with colored ink to a unit area is completed in the eight passes from 1st to 8th pass.

Figure 11:
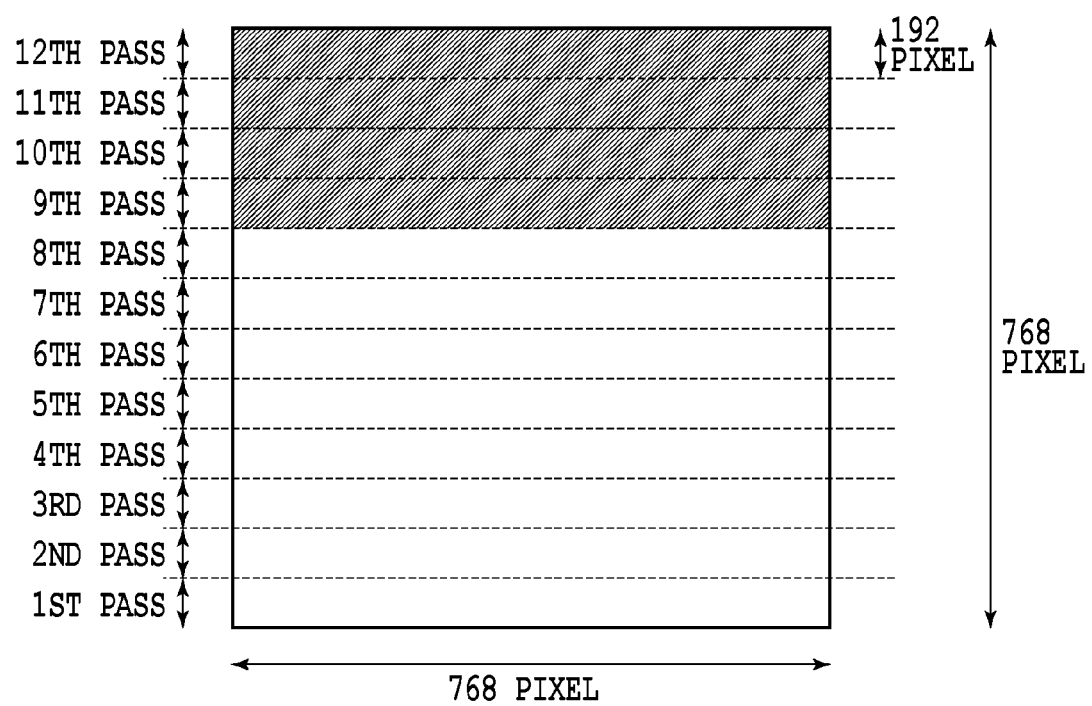
FIG. 11 is a diagram illustrating a mask pattern according to the present embodiment used by a mask processing section 910.

On the other hand, FIG. 11 is a diagram illustrating a mask pattern according to the present embodiment used by the mask processing section 910, which performs mask processes to the clear ink data CL2. As illustrated in FIG. 11, unlike the mask pattern used for the colored ink and the clear ink data CL1 illustrated in FIG. 10, ON dots exist only in the divided mask areas corresponding to 9th pass to 12th pass, with no ON dots in the divided mask areas corresponding to 1st pass to 8th pass.

Figure 12:
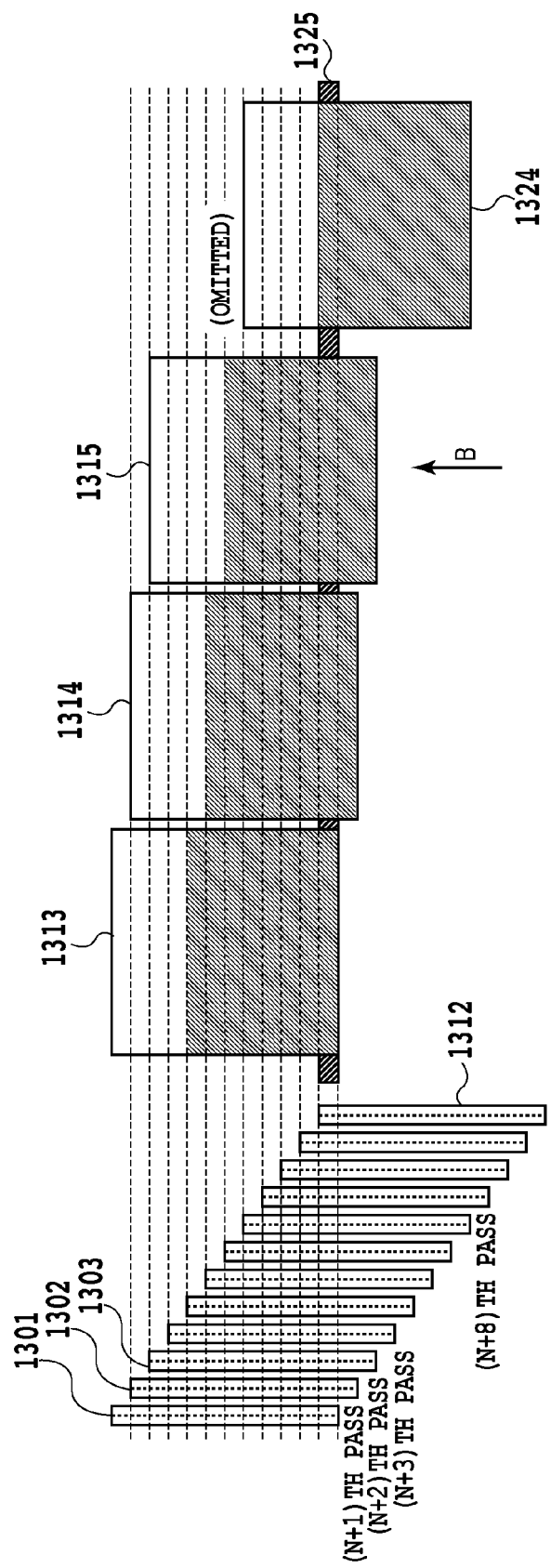
FIG. 12 is a diagram illustrating how the mask pattern illustrated in FIG. 10 is used by the mask processing section 909 in multi-pass printing.
Figure 13:
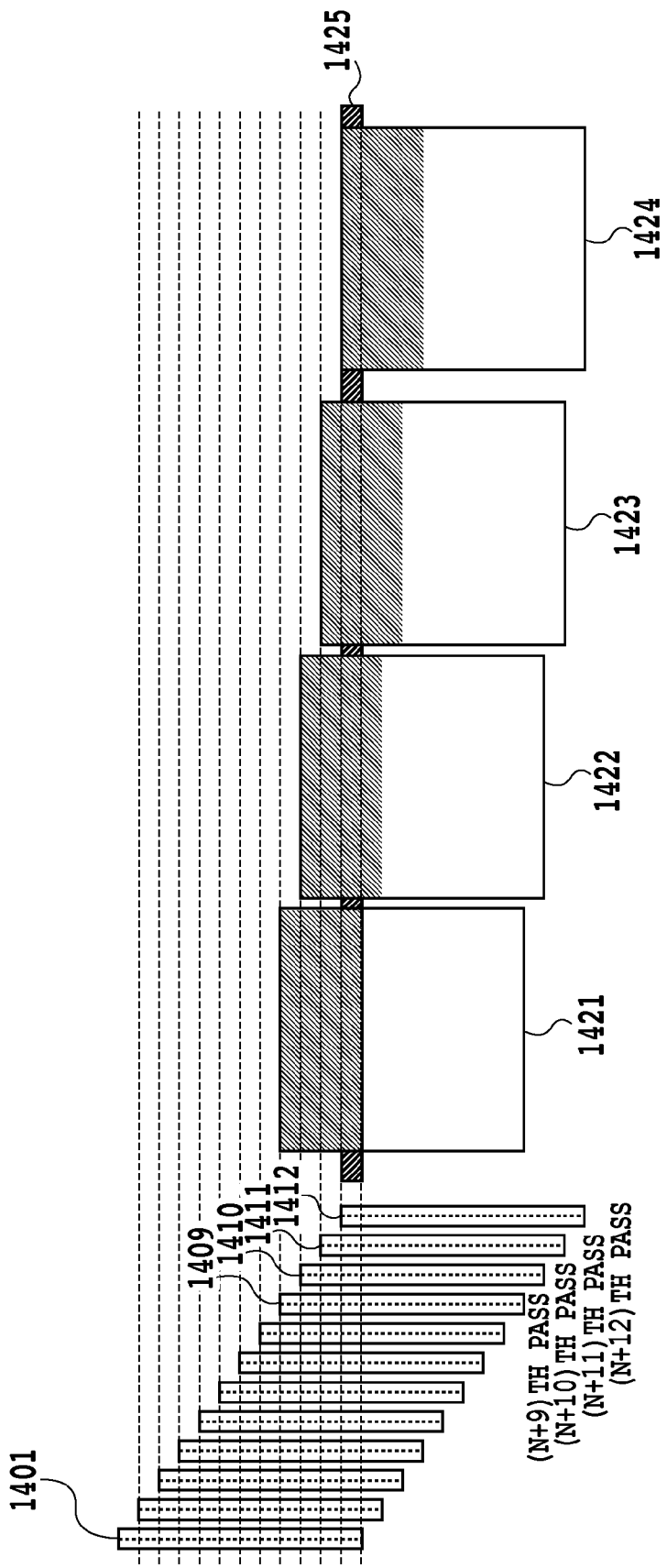
FIG. 13 is a diagram illustrating how the mask pattern illustrated in FIG. 11 is used by the mask processing section 910 in multi-pass printing, and generally illustrating how multi-pass printing is conducted.

FIGS. 12 and 13 are diagrams respectively illustrating how the mask pattern illustrated in FIG. 10, which is used by the mask processing section 909, and the mask pattern illustrated in FIG. 11, which is used by the mask processing section 910, are used in multi-pass printing. These drawings are similar to FIG. 9.

Reference numerals 1301 to 1312 in FIG. 12 and reference numerals 1401 to 1412 in FIG. 13 indicate the print head (the print head is illustrated for only one color, similarly to FIG. 9). Also, reference numerals 1313 to 1324 in FIG. 12 and reference 1421 to 1424 in FIG. 13 indicate a single mask pattern associated with a nozzle array in the print head, similarly to FIG. 9.

As illustrated in FIG. 12, the divided mask areas (1st pass to 8th pass) illustrated in FIG. 10 are used during the scans of (N+1)-th pass to (N+8)-th pass to print the unit area 1325 on the basis of print data generated thereby. When this 8-pass printing finishes, next, as illustrated in FIG. 13, the divided mask areas (9th pass to 12th pass) illustrated in FIG. 11 are used during the scans of (N+9)-th pass to (N+12)-th pass to print the unit area 1425 (the same area as the area 1325) on the basis of print data generated thereby.

As a result, 8-pass printing based on the clear ink data CL1 and the colored ink data is first conducted on the unit area (1325, 1425). After the 8-pass printing based on the clear ink data CL1 and the colored ink data, 4-pass printing is conducted on the basis of the clear ink data CL2 in separate passes.

Referring again to FIG. 6, after generating the binary data for the clear ink and the colored ink using the respective mask patterns of the mask processing sections 909 and 910 as described above, the combining section 911 combines the clear ink data CL1 and CL2. Since the 12 divided mask areas have mutually exclusive arrangements of ON dots in a mask pattern obtained by combining the mask patterns illustrated in FIGS. 10 and 11, the combining process takes the logical sum of the respective data. The clear ink data combined by the combining section 911 is sent to the clear ink print head (nozzle array) 913, and the print head is driven and clear ink is ejected on the basis thereof.

Figure 14:
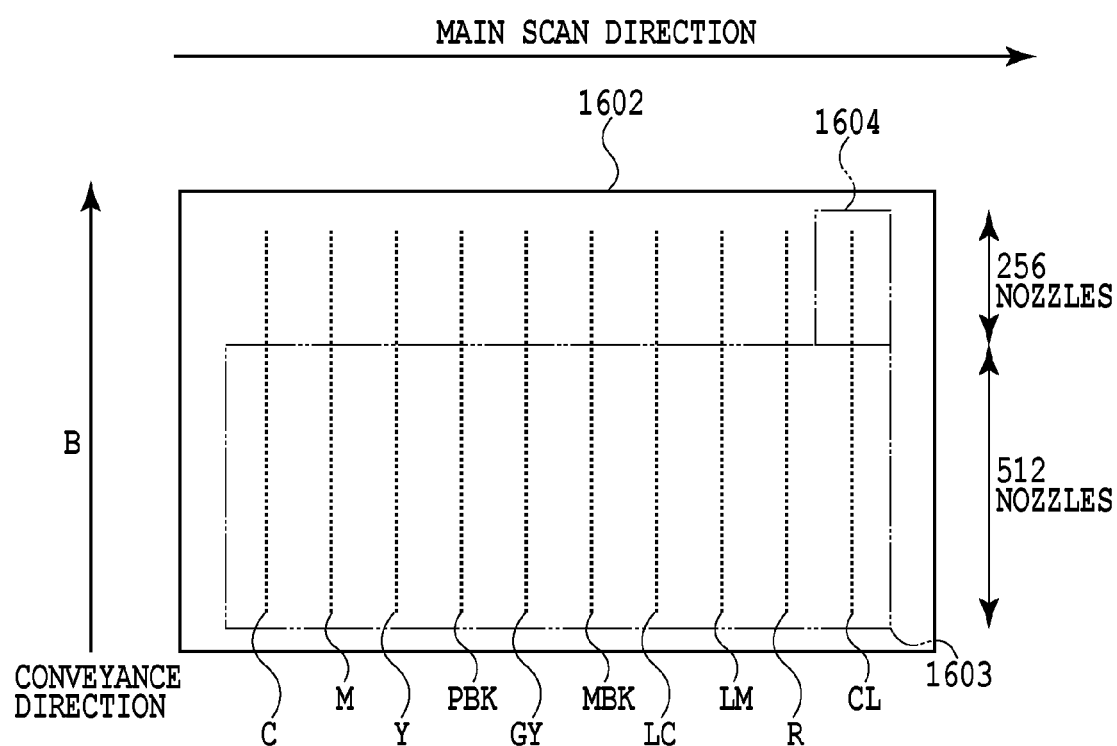
FIG. 14 is a diagram primarily illustrating nozzle lines that respectively eject nine colors of ink and clear ink in a print head according to the present embodiment.

FIG. 14 is a diagram primarily illustrating nozzle arrays that respectively eject the nine color inks and one clear ink in the print head according to the present embodiment. As illustrated in FIG. 14, on the print head 1602, the nozzle usage range 1603 is the lower 512 nozzles corresponding to the mask pattern illustrated in FIG. 10, while the nozzle usage range 1604 corresponding to the mask pattern illustrated in FIG. 11 is the upper 256 nozzles for clear ink. With this configuration, since a print medium is conveyed in the direction of the arrow B illustrated in FIG. 14, printing by the nozzle usage range 1603 is conducted during the earlier scans, while printing by the nozzle usage range 1604 is conducted during the later scans.

Also, since printing is conducted with scans in both directions during printing operations, printing is conducted with scans proceeding from left to right as well as with scans proceeding from right to left as viewed in FIG. 14. For this reason, in these respective scans, the clear ink is ejected onto the same area before and after the colored ink, respectively.

Note that in the application 901 illustrated in FIG. 6, the user is able to set a print mode from among a plurality of print modes. Hereinafter, an embodiment of the present invention will be described for the case of selecting between a "Standard" mode (first print mode) and a "Fine" mode (second print mode). Depending on the respective print mode settings, the color processing section 902 performs a different gamut conversion 902A, while also performing the color separation 902B on the basis of the image data obtained by the gamut conversion as discussed above, and sets the usage amount for each ink color as well as respective usage amounts for the clear ink CL1 (first clear ink) and the clear ink CL2 (second clear ink). Note that the clear ink CL1 and the clear ink CL2 have the clear ink composition discussed earlier. The clear ink CL1 and the clear ink CL2 may be inks having entirely the same compositions, but may also have different compositions.

Figure 15A:
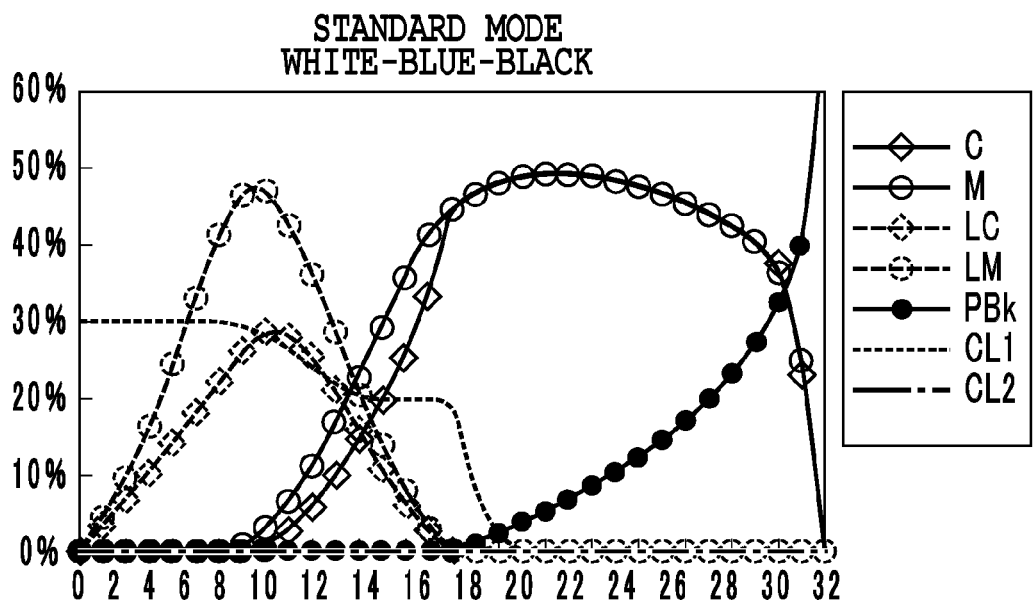
FIGS. 15A and 15B are diagrams illustrating color separation tables, used by a color processing section 902, which respectively correspond to a "Standard" mode and a "Fine" mode.
Figure 15B:
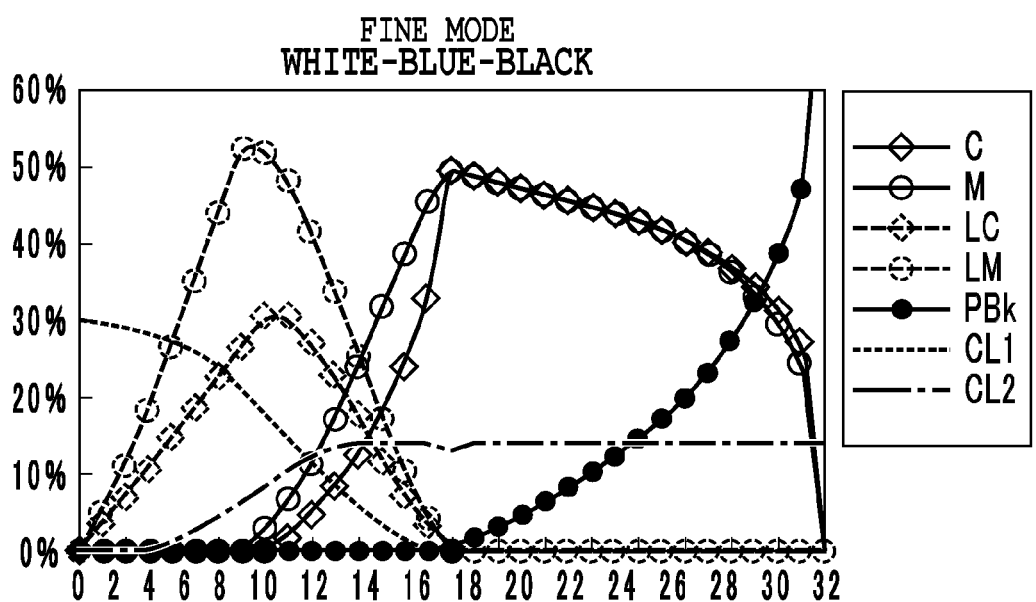

FIGS. 15A and 15B are diagrams illustrating color separation tables for the "Standard" mode and the "Fine" mode used in the color separation 902B. Specifically, FIGS. 15A and 15B illustrate respective usage amounts (duties) for each colored ink and each clear ink for 33 colors expressing white-blue-black, with the RGB values of the image data starting from a white point at (255, 255, 255), passing a blue point at (0, 0, 255), and ending on a black point at (0, 0, 0). On the horizontal axes of the graphs, point 16 corresponds to the color at (0, 0, 255), or in other words the primary color of blue at maximum saturation. Meanwhile, point 32 corresponds to black. On the vertical axes of the graphs, the ink usage amount (application amount) is indicated as a percentage (duty). Note that in the present embodiment, 100% is defined to be the amount of ink from applying eight dots of 4 pL ink droplets on one unit section of a 600 dpi grid on a print medium. In FIGS. 15A and 15B, the clear ink CL1 is an ink for printing by ejecting clear ink onto the same area during the same scan as colored ink as discussed earlier regarding multi-pass printing. Hereinafter, the clear ink CL1 will also be referred to as mixed clear ink. Meanwhile, the clear ink CL2 is clear ink ejected onto the same area as above, but during a separate scan after printing with the colored ink. Hereinafter, the clear ink CL2 will also be referred to as after application clear ink.

In the Standard mode, clear ink is applied as the mixed clear ink CL1 during 1st to 8th passes that apply colored ink, whereas neither colored ink nor after application clear ink CL2 is applied in 9th to 12th passes. In other words, nothing is applied during 9th to 12th passes of the Standard mode, effectively resulting in 8-pass printing. Consequently, it is sufficient to perform eight scans by the print head over each area on the print medium, without performing scans on 9th to 12th passes. On the other hand, in the Fine mode, clear ink is applied as the mixed clear ink CL1 during 1st to 8th passes that apply colored ink, whereas clear ink is applied as the after application clear ink CL2 without applying colored ink in 9th to 12th passes.

FIG. 15A illustrates the color separation table in the Standard mode, in which the mixed clear ink CL1 has an approximately uniform usage amount of 30% near the center of the range from the white point to the blue point. In addition, the usage amount is decreased from near the center to the blue primary color at point 16. Thus, a bronze-suppressing effect suitable for the blue primary color can be obtained at that color. It is also possible to form gradations where unnatural glossiness such as bronze and interference color do not occur over continuous gradations from white to the blue primary color in the Standard mode. Furthermore, the black ink usage amount increases from the blue primary to black in order to increase density. At this point, there is an increase in the types of inks used other than cyan ink and magenta ink, and the compound colors with black ink cause imbalances with the mixed clear ink CL1. For this reason, the mixed clear ink amount is dropped sharply to reduce the extent of bronzing and interference color as much as possible. The amount of mixed clear ink CL1 is set to 0 from point 20 to point 28 on the horizontal axis. This is to maintain the continuity of glossiness such as bronze and interference color between the range from point 20 to point 28 and all other ranges, and also because the function of the mixed clear ink is unable to exhibit its fullest potential since high rates of both cyan ink and magenta ink are used in the range from point 20 to point 28.

On the other hand, FIG. 15B is a diagram similar to FIG. 15A, illustrating the color separation table for the Fine mode. FIG. 15B differs from the color separation table for the Standard mode illustrated in FIG. 15A in that the after application clear ink CL2 is used in addition to the mixed clear ink CL1. As illustrated in FIG. 15B, the usage amount of the mixed clear ink CL1 is gradually decreased from the white point to the blue point, and the usage amount is set to 0 at the blue primary color at point 16. This is because the mixed clear ink CL1 is effective at suppressing bronze and interference color in portions of high lightness. Meanwhile, the after application clear ink CL2 starts being used around point 4, and the usage amount is set to approximately 13% at the blue primary color. The usage amount of the mixed clear ink CL1 becomes 0 in consideration of balance with the effectiveness of the mixed clear ink CL1 from this point, but the after application clear ink CL2 is effective in this portion, and continues to be used at approximately 15% up to the black point.

By setting the clear ink usage amounts as above, it is possible to suppress bronzing in the Standard mode where colored ink data and clear ink are applied in the same pass, without imparting a particularly strong unnatural look except for specific colors (the blue region). However, in the blue region where the above ink usage amounts are expressed, although the result is better than not using CL1, bronzing and interference color cannot be eradicated, and this portion may appear purple in some cases.

On the other hand, since in the Fine mode the clear ink is applied after the printing with colored ink has completed, bronzing can be suppressed to a high level. It is also possible to improve glossiness and suppress the diffuse reflection of light, effectively increasing the range of color reproduction.

Figure 16A:
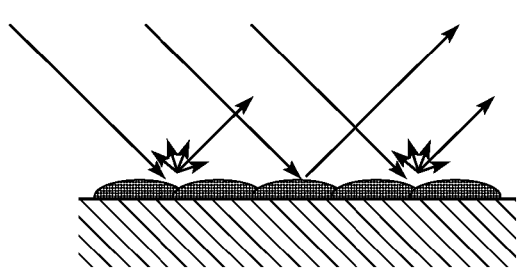
FIGS. 16A to 16C are schematic diagrams illustrating states of bronzing and diffuse reflection of light.
Figure 16B:
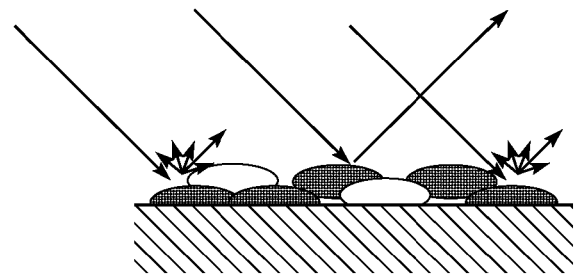
Figure 16C:
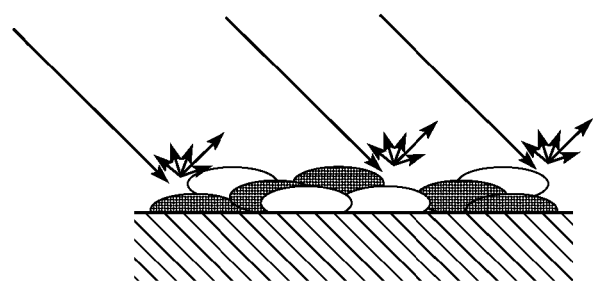

FIGS. 16A to 16C are diagrams illustrating the relationship between the diffuse reflection of light and bronzing. In the case of printing with a clear ink amount of 0%, or in other words using cyan ink only, the outermost surface of the ink is uniform, and thus there is little diffuse reflection of light at the ink surface, as illustrated in FIG. 16A. In contrast, increasing the amount of clear ink by the data CL1 applied during the same scan as the colored ink gradually increases the irregularity of the outermost surface of the ink, increasing the diffuse reflection of light at the outermost surface, as illustrated in FIGS. 16B and 16C. In this way, if clear ink is applied so as to increase the diffuse reflection of light, the specular light component equivalently decreases, and thus the bronzing produced due to color change in the specular light weakens. On the other hand, applying clear ink during scans after the scans where the colored ink is applied improves glossiness and suppresses the diffuse reflection of light, effectively increasing the range of color reproduction, as discussed above.

An image printed in the Standard mode and an image printed in the Fine mode as described above differ in the application amounts of the clear ink and ink and the number of scans by print head which are used to complete printing a unit area, and differences occur in the way that clear ink functions and the degree to which clear ink suppresses bronze colors and color change due to the optical interference state. As a result, the image colors actually perceived by the observer will appear differently between the modes. In other words, bronzing causes a shift in the gamut reproduced by the Standard mode and the gamut reproduced by the Fine mode, and as a result, induces enough of a difference to cause the observer to perceive a disparity in blue colors where the difference due to bronzing and interference color is large. Such differences in perceived color then lead to an undesirable situation in which image colors do not match across the modes under typical usage scenarios where the user of the system selects the Standard mode when demanding productivity with an emphasis on speed, and selects the Fine mode as a finishing mode.

Bronzing is known to cause reflected light, particularly light originating from cyan ink, to become an unnatural magenta color. As discussed earlier, the blue region forms an image by using both cyan ink and magenta ink. Furthermore, other printer systems typically have built-in light inks with thinner pigment concentrations of their respective inks. Compared to cyan ink and magenta ink at normal concentrations, such photo cyan ink and photo magenta ink results in different bronze and interference color compared to the dark inks. In other words, the blue region forms an image with compound colors by these four inks as well as other inks, and is a portion where bronzing and interference color is difficult to suppress compared to other color portions. Although clear ink may be used differently depending on the print mode to conduct bronzing suppression and interference color suppression as in the present embodiment, bronzing and interference color cannot be reduced to zero for compound colors at all amounts of clear ink and colored inks being used in the blue region. Particularly, it is not possible to suppress the gamut shift due to bronzing and interference color in the Standard mode that does not have the after application of clear ink.

Figure 17:
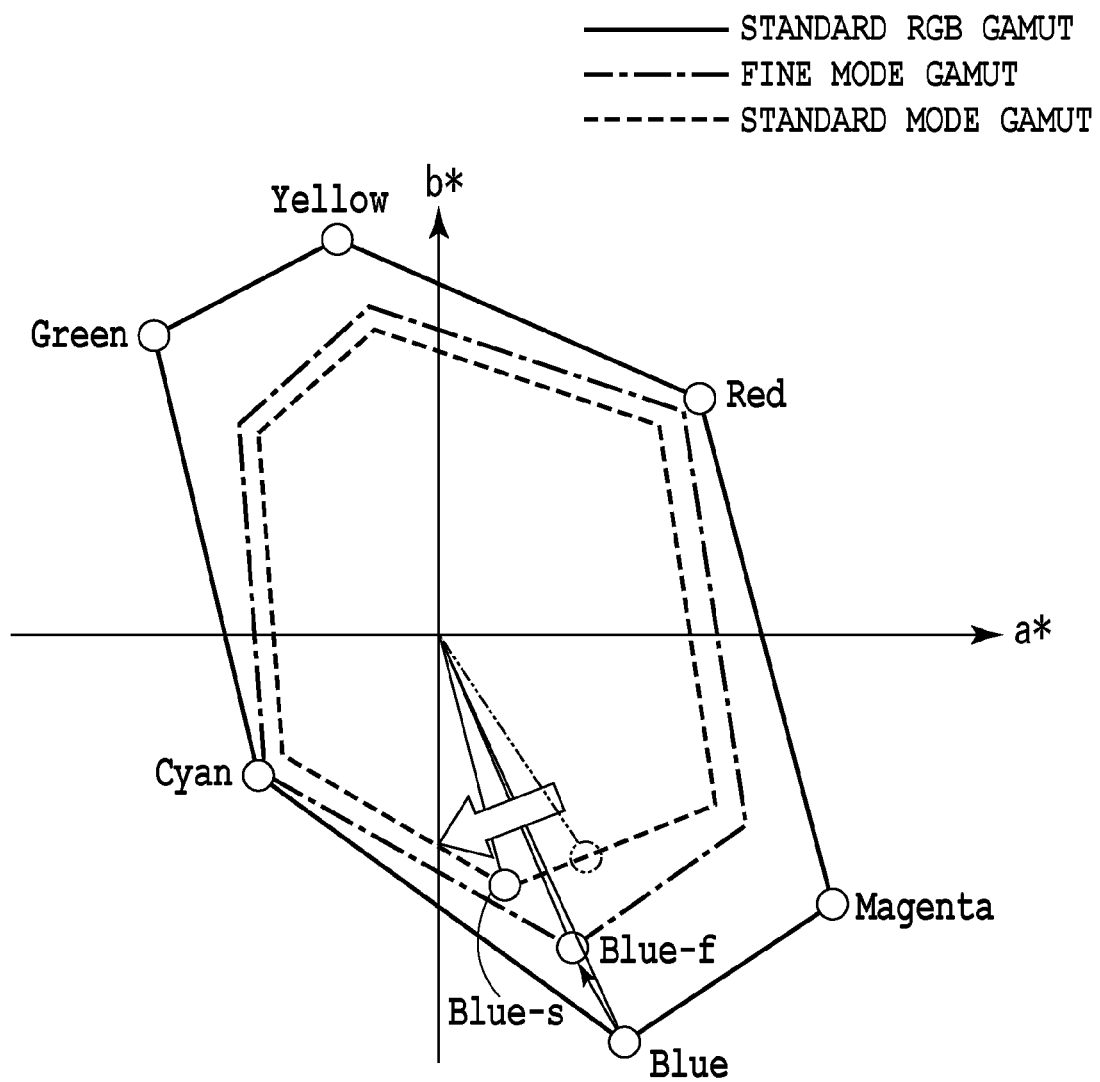
FIG. 17 is a diagram illustrating gamut converting section according to the first embodiment of the present invention.

FIG. 17 is a diagram illustrating gamut conversion according to the first embodiment of the present invention. Specifically, FIG. 17 illustrates the specifics of the conversion by the gamut conversion 902A in the color processing section 902 (FIG. 6), and illustrates how colors in the standard RGB color reproduction range are mapped to colors in the color reproduction range of the respective print modes.

As illustrated in FIG. 17, with the gamut conversion of the present embodiment, when the Fine mode is selected, the blue primary color "Blue" in the standard RGB gamut is mapped to the primary color "Blue-f" in the Fine mode gamut with almost no change in hue. More specifically, in the gamut reproduced by the Fine mode in the present embodiment, the blue primary color "Blue-f" is reproduced at almost the same hue as the blue primary color "Blue" in the standard RGB gamut. For this reason, the gamut conversion performs mapping while approximately maintaining hue as above.

On the other hand, when the Standard mode is selected, the blue primary color "Blue" in the standard RGB gamut is mapped to a color within the Standard mode gamut at a point (color) that has moved in a clockwise direction as viewed in FIG. 17 from that hue, and that color is taken to be the primary color "Blue-s" in the Standard mode gamut. In other words, in the Standard mode gamut, as a result of using clear ink for the purpose of bronze suppression as illustrated in FIG. 15A, the primary color "Blue-s" becomes a color that the observer perceives as though a point (color) on the chain line in FIG. 17. In other words, the primary color "Blue-s" is perceived as a color shifted counter-clockwise as viewed in FIG. 17 from the hue of the blue primary color "Blue" in the standard RGB gamut. This gamut shift is then recognized as a difference in perceived color between the Fine mode and the Standard mode. In contrast, in the present embodiment, the blue primary color "Blue" in the standard RGB gamut is mapped to a point (color) that has moved in the clockwise direction as discussed above, and that color is taken to be the primary color "Blue-s" in the Standard mode gamut. As a result, when the observer observes this color, the color shifted in the counter-clockwise direction is perceived as a color of the same hue as the primary color "Blue-f" in the Fine mode gamut, suppressing the difference in perceived color between the Fine mode and the Standard mode.

Note that the point (color) that has moved in a clockwise direction discussed above is determined by selecting a point (color) with a slight difference in perceived color between the modes by printing, taking calorimetric measurements, and actually observing the color.

The phenomenon described above appears even more strongly in the case of not using clear ink. In the hypothetical case of setting the Standard mode as a mode that does not use the clear ink, color conformity between the modes can be raised by conduct gamut conversion that moves hues even farther in the clockwise direction. To take a typical example, hues in the blue region are hues having a hue angle of 280° to 305° in the standard RGB color space with an L*a*b* coordinate system. This is close to the standard RGB color space normally used in monitors. In this example, by conducting gamut conversion for the Standard mode such that hues are measured at approximately a maximum of 10° clockwise compared to the Fine mode, or in other words such that the hue angle decreases, the color perceived by an observer nearly matches between the modes.

Also, although the above description relates to hue angles with respect to blue at maximum saturation, the present embodiment is configured such that the hue rotation of other, continuously expressed colors is continuously followed and mapped. More specifically, as illustrated in FIG. 17, the gamut conversion is performed such that for the overall color reproduction range in the Standard mode, the blue region is measured clockwise with respect to the color reproduction range in the Fine mode.

Figure 18:
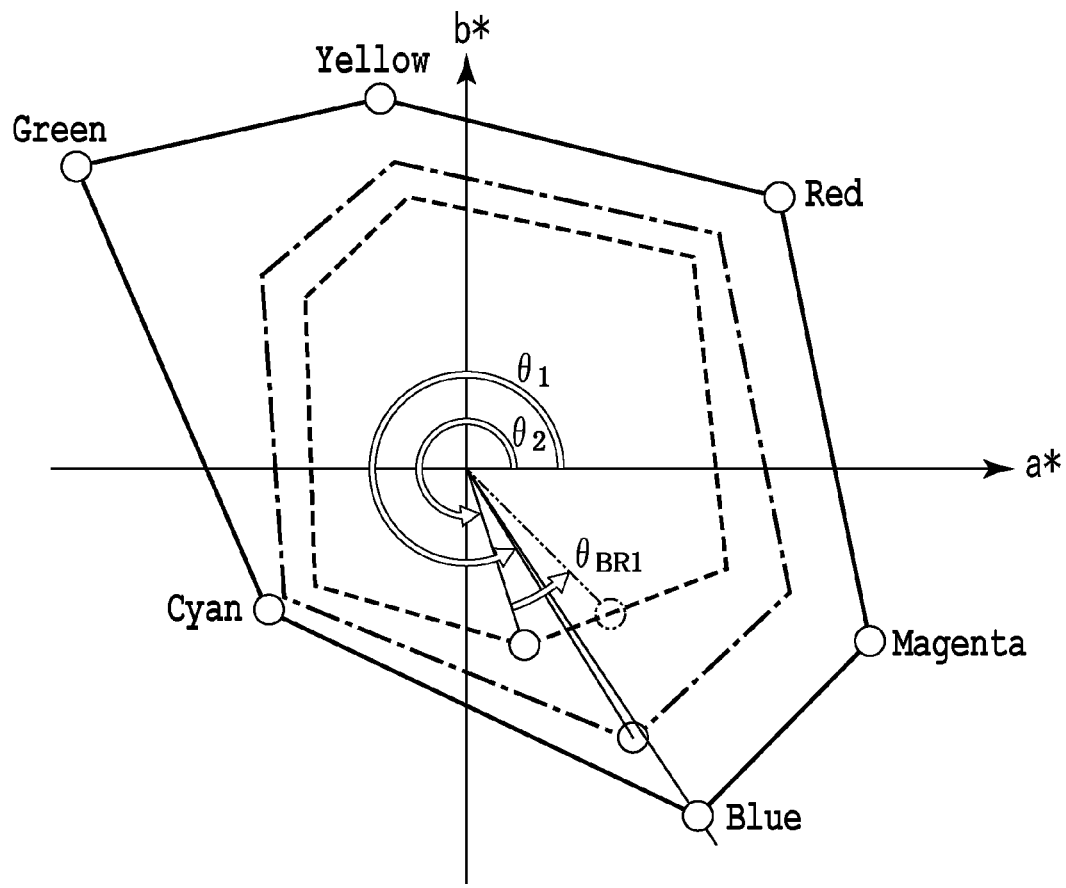
FIG. 18 is a diagram illustrating actual hue angles.

FIG. 18 will now be used to specifically describe actual hue angles. Overall, the blue region uses large amounts of cyan ink for which bronze readily occurs, additionally complicated by the phenomenon of its visual features readily shifting to magenta. This makes color matching difficult. In FIG. 18, θ1 is the blue hue angle in the Fine mode, θ2 is the blue hue angle in the Standard mode, and θBR1 is the differential angle of the blue region visual features with the bronze component. Generally, mapping standard RGB colors to the same hue angles yields printed matter with approximately the same colors, except for the blue region. However, viewers perceive a mismatch between the modes due to the bronzing component and the visual features discussed above. Bronzing becomes significantly large particularly in the case of using clear ink versus not using clear ink, and reinforces the perceived mismatch by viewers. Consequently, a viewer perceiving bronze perceives color at the θBR1 point, thus requiring the Standard mode to reproduce color by applying compensation when printing. The hue angle at this point becomes θ2.

Note that although the example described above is an example of the case where there is no shift in the Fine mode gamut, obviously the present embodiment is not limited to this example. In other words, it is possible to conduct gamut converting section similar to the case of the above Standard mode in the case where there is a shift in the Fine mode gamut and an observer perceives the hue of the primary color "Blue-f" as different from the blue primary color "Blue" in the standard RGB gamut. Even in this case, the hue of the primary color "Blue-f" in the Fine mode and the hue of the primary color "Blue-s" in the Standard mode will differ, and by conducting gamut converting section applying the present invention, the observer is able to perceive these colors as the same hue.

Note that although the Fine mode of the present embodiment involves conducting 8-pass printing using colored ink and clear ink, followed by 4-pass printing using clear ink without using colored ink, the number of passes is not limited thereto. It is sufficient to have at least one scan that applies clear ink without applying colored ink after a scan that applies colored ink.

Second Embodiment

The first embodiment of the present invention relates to an example of using clear ink to control the color expressed with cyan ink whose pigment properties readily exhibit bronzing. Obviously, however, the application of the present invention is not limited to this example. Clearly, the present invention can still be applied in the same way as between multiple print modes in the case where, for example, bronzing occurs and causes a pigment ink with highly consistent color production to appear as ink of another color.

Third Embodiment

The foregoing first embodiment describes conducting the gamut converting section so that the primary color blue has different hue angles in the L*a*b* coordinates between the Standard mode that does not perform the after application of clear ink, and the Fine mode that performs the after application of clear ink.

In the present embodiment, the ink application method differs from the first embodiment. First, a first print mode applies color ink without applying clear ink in 1st to 8th passes, whereas a second print mode applies both clear ink and color ink in 1st to 8th passes. In other words, the first print mode is a mode that applies just color ink without applying clear ink, while the second print mode is a mode that applies mixed color ink and clear ink.

Herein, bronzing and interference color differences more easily occur in the first print mode that does not apply clear ink than in the second print mode that does apply clear ink, and are particularly noticeable in blue colors. In other words, in order for the primary color blue to be perceived as a color of the same hue in the standard RGB color space in L*a*b* coordinates, the blue color in the first print mode must be a color with red tints suppressed in advance compared to the blue color in the second print mode. Consequently, in the present embodiment, an ink application amount is determined such that the primary color blue in the first print mode is measured as a color where the hue angle in the L*a*b* coordinates has moved in a clockwise direction compared to the primary color blue in the second print mode. With such a method, it is possible to suppress perceived color differences in the case of printing the primary color blue in the two modes having different clear ink application methods.

The first print mode may also apply color ink without applying clear ink in 1st to 8th passes, while the second print mode may apply color ink without applying clear ink in 1st to 8th passes, and apply clear ink without applying color ink in 9th to 12th passes. Even in this case, an ink application amount is still determined such that the primary color blue in the first print mode is measured as a color where the hue angle in the L*a*b* coordinates has moved in a clockwise direction compared to the primary color blue in the second print mode. Thus, it is possible to suppress the phenomenon of a primary color being perceived as different colors between the modes.

Also, although the first embodiment describes using a serial printer illustrated in FIG. 5 that prints an image onto a print medium by scanning a print head over the print medium, the present invention is not limited thereto. The present invention is also applicable to a full-width multi-pass printer that prints an image by conveying a print medium with respect to a print head. For example, in a printer equipped with multiple print heads for individual ink colors on which nozzles are arranged in a direction intersecting the conveyance direction of the print medium, a print head that applies clear ink may be disposed farthest downstream in the conveyance direction of the print medium. In addition, the hue angle of the primary color blue in the first print mode that does not apply clear ink is set to an angle moved farther in a clockwise direction in the L*a*b* coordinates than the hue angle of the primary color blue in the second print mode that applies clear ink. With such a configuration, it is possible to suppress the difference between the color that an observer perceives for the primary color blue printed in the first print mode, and the color that the observer perceives for the primary color blue printed in the second print mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107039, filed May 8, 2012, 2013-084980, filed Apr. 15, 2013 which are hereby incorporated by reference herein in their entirety.

What is claimed is:

1. An image processing apparatus that generates print data used by a printing unit capable of applying colored ink and clear ink to a print medium and performing a plurality of relative scans over a predetermined area of the print medium, so as to print an image, said apparatus comprising:
a gamut converting unit configured to convert image data such that a color in a predetermined gamut is converted into a color in a print gamut which the printing unit is able to reproduce; and
a print data generating unit configured to generate print data based on the image data converted by said gamut converting unit, wherein
said print data generating unit generates respective print data for a first print mode and a second print mode which are different from each other wherein the clear ink is applied in the same relative scans as the colored ink in the first print mode, and (i) the clear ink is applied in the same relative scans as the color ink and (ii) the clear ink is applied in the relative scans after the relative scans in which the clear ink and the colored ink are applied in the second print mode, and
said gamut converting unit is further configured to convert a color of a blue hue in the predetermined gamut into a first color in the print gamut when the first print mode is performed, and to convert the color of a blue hue in the predetermined gamut into a second color in the print gamut when the second print mode is performed, the second color having a different hue from that of the first color, the clear ink being applied in the first and second print modes such that the first color in the first print mode and the second color in the second print mode are perceived to be colors of the same hue.

2. The image processing apparatus as claimed in claim 1, wherein the colored ink contains a color material and the clear ink does not contain the color material.

3. The image processing apparatus as claimed in claim 1, wherein the first print mode is a mode in which the colored ink and the clear ink are applied in the same scan by the printing unit, and the second print mode is a mode in which the colored ink and the clear ink are applied in the same scan and the clear ink is applied, but the colored ink is not applied, in a scan after the scan in which both the colored ink and the clear ink are applied.

4. The image processing apparatus as claimed in claim 1, wherein hues of the color of blue hue have a hue angle of 280° to 305° in a standard RGB color space with an L*a*b* coordinate system.

5. The image processing apparatus as claimed in claim 4, wherein said gamut converting unit is further configured to obtain a hue angle, and a hue angle of the blue obtained by said gamut converting unit in a case of executing the first print mode, is smaller than a hue angle of the blue obtained by said gamut converting unit in a case of executing the second print mode.

6. The image processing apparatus as claimed in claim 1, wherein the color of a blue hue shows maximum saturation in the predetermined gamut.

7. The image processing apparatus as claimed in claim 6, wherein said gamut converting unit is further configured to convert the image data which is in a standard RGB color space, and
the blue showing the maximum saturation is a color obtained by converting data of R=0, G=0 and B=255.

8. The image processing apparatus as claimed in claim 6, wherein said gamut converting unit is further configured to obtain a hue angle, and
the hue angle of the blue obtained by said gamut converting unit converting the image data in a case of executing the first print mode is smaller than a hue angle of the blue obtained by said gamut converting unit converting the image data in a case of executing the second print mode.

9. The image processing apparatus as claimed in claim 1, wherein said print data generating unit is further configured to generate the respective print data for the first print mode such that the colored ink is applied in a last scan to the predetermined area and the second print mode such that the clear ink but not the colored ink is applied in the last scan to the predetermined area.

10. An ink jet printing apparatus, comprising:
a printing unit configured to apply colored ink and clear ink to a print medium and perform a plurality of relative scans over a predetermined area of the print medium so as to print an image, wherein
said printing unit is further configured to execute a first print mode where the colored ink and the clear ink are applied in a same scan, and a second print mode where the colored ink and the clear ink are applied in the same scan and the clear ink is applied, but the colored ink is not applied, in a scan after the scan in which both the colored ink and the clear ink are applied,
said printing unit is further configured to print the image based on image data that includes a predetermined color which shows as different colors, in a color system in which colorimetric values of the colors are obtained, between the first and second print modes.

11. The ink jet printing apparatus as claimed in claim 10, wherein said printing unit prints the image such that specular reflection lights of the different colors are measured as the same color between the first and second print modes.

12. An image processing method of generating print data used by a printing unit capable of applying colored ink and clear ink to a print medium and performing a plurality of relative scans over a predetermined area on the print medium, so as to print an image, said method comprising:
a gamut converting step of converting image data such that a color in a predetermined gamut is converted into a color in a print gamut which the printing unit is able to reproduce; and
a print data generating step of generating respective print data for a first print mode and a second print mode based on the image data converted in the gamut converting step, wherein
the first print mode and the second print mode are different from each other wherein the clear ink is applied in the same relative scans as the colored ink in the first print mode, and (i) the clear ink is applied in the same relative scans as the color ink and (ii) the clear ink is applied in the relative scans after the relative scans in which the clear ink and the colored ink are applied in the second print mode, and in said gamut converting step, a color of a blue hue in the predetermined gamut is converted into a first color in the print gamut when the first print mode is performed, and the color of a blue hue is converted into a second color in the print gamut when the second print mode is performed, the second color having a different hue from that of the first color, the clear ink being applied in the first and second print modes such that the first color in the first print mode and the second color in the second print mode are perceived to be colors of the same hue.

13. The image processing method as claimed in claim 12, wherein the respective print data is generated, in the print data generating step, for the first print mode such that the colored ink is applied in a last scan to the predetermined area and for the second print mode such that the clear ink but not the colored ink is applied in the last scan to the predetermined area.

14. An image processing apparatus that generates print data used by a printing unit capable of applying colored ink and clear ink to a print medium and performing a plurality of relative scans over a predetermined area of the print medium, so as to print an image, said apparatus comprising:

a gamut converting unit configured to perform conversion of image data so that a color in a predetermined gamut is converted into a color in a print gamut which the printing unit is able to reproduce; and a print data generating unit configured to generate respective print data for a first print mode that is a mode in which the colored ink and the clear ink are applied in the same scan by the printing unit and a second print mode that is a mode in which the colored ink and the clear ink are applied in the same scan and the clear ink is applied, but the colored ink is not applied, in a scan after the scan in which both the colored ink and the clear ink are applied by the printing unit, wherein said gamut converting unit performs the conversion so that a hue of a predetermined color in the predetermined gamut printed by executing the first print mode is different from a hue of the predetermined color in the predetermined gamut printed by executing the second print mode.

\* \* \* \* \*